US012720197B2

(12) United States Patent
Moon et al.

(10) Patent No.: US 12,720,197 B2
(45) Date of Patent: Aug. 25, 2026

(54) IMAGE SENSOR, ELECTRONIC DEVICE INCLUDING IMAGE SENSOR AND OPERATING METHOD THEREOF

(71) Applicant: Samsung Electronics Co., Ltd., Suwon-si (KR)

(72) Inventors: Inah Moon, Suwon-si (KR); Jaehyoung Park, Suwon-si (KR); Shuichi Shimokawa, Suwon-si (KR); Kawang Kang, Suwon-si (KR); Byeongjoo Song, Suwon-si (KR); Yeotak Youn, Suwon-si (KR); Jonghoon Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 19/024,118

(22) Filed: Jan. 16, 2025

(65) Prior Publication Data

US 2025/0168507 A1 May 22, 2025

Related U.S. Application Data

(63) Continuation of application No. PCT/KR2024/015952, filed on Oct. 21, 2024.

(30) Foreign Application Priority Data

Nov. 13, 2023 (KR) ........................ 10-2023-0156489
Jan. 16, 2024 (KR) ........................ 10-2024-0006872

(51) Int. Cl.

*H04N 23/67* (2023.01)
*H04N 25/40* (2023.01)
*H04N 25/78* (2023.01)

(52) U.S. Cl.

CPC ........... *H04N 23/672* (2023.01); *H04N 25/41* (2023.01); *H04N 25/78* (2023.01)

(58) Field of Classification Search

CPC ...... H04N 25/41; H04N 25/78; H04N 25/704; H04N 23/672

(Continued)

(56) References Cited

U.S. PATENT DOCUMENTS 9,762,821 B2 * 9/2017 Lee ...................... H04N 25/583
9,973,682 B2 * 5/2018 Ham .................... H04N 25/704

(Continued)

FOREIGN PATENT DOCUMENTS

CN 110364541 A 10/2019
KR 10-2018-0108414 A 10/2018

(Continued)

OTHER PUBLICATIONS

International Search Report dated Feb. 7, 2025, issued in International Application No. PCT/KR2024/015952.

*Primary Examiner* — Pritham D Prabhakher
(74) *Attorney, Agent, or Firm* — Jefferson IP Law, LLP

(57) ABSTRACT

An electronic device according to various embodiments may include a camera module. An image sensor of the camera module may include a first pixel group configured to output phase difference data of a first direction and a second pixel group configured to output phase difference data of a second direction. The image sensor according to various embodiments may be configured to obtain the phase difference data for two or more directions without increasing the number of analog-to-digital converting operations. In addition to the embodiment described above, various embodiments are possible.

25 Claims, 18 Drawing Sheets

(58) Field of Classification Search
USPC .......................................................... 348/308
See application file for complete search history.

(56) References Cited

U.S. PATENT DOCUMENTS 10,440,301 B2 * 10/2019 Li ............................ G02B 7/09
10,658,412 B2 * 5/2020 Masagaki ........... H10F 39/8053
10,734,426 B2 8/2020 Do
11,350,044 B2 * 5/2022 Mori ...................... H04N 25/00
11,575,859 B2 * 2/2023 Park ..................... H04N 25/447
11,671,705 B2 6/2023 Shim et al.
11,721,713 B2 * 8/2023 Lee ....................... H10F 39/182
348/308
11,722,795 B2 * 8/2023 Kim ..................... H04N 25/587
11,863,893 B2 1/2024 Lim et al.
12,200,371 B2 * 1/2025 Lee ........................ H04N 25/59
12,243,883 B2 * 3/2025 Pyo ..................... H10F 39/8023
12,244,945 B2 * 3/2025 Choi .................... H04N 25/704
12,464,234 B2 * 11/2025 Moon .................. H04N 23/672
12,568,697 B2 * 3/2026 Jeong ...................... H10F 39/18
2017/0019584 A1 1/2017 Ham
2018/0301484 A1 10/2018 Vaartstra et al.
2019/0082130 A1 3/2019 Li et al.
2019/0319060 A1 * 10/2019 Do ...................... H10F 39/8023
2019/0371837 A1 12/2019 Masagaki et al.
2020/0137325 A1 4/2020 Mori et al.
2021/0344882 A1 11/2021 Park et al.
2022/0328548 A1 * 10/2022 Lee ........................ H04N 25/78
2022/0344389 A1 * 10/2022 Pyo ..................... H10F 39/8023
2022/0377267 A1 * 11/2022 Lim ..................... H04N 25/778
2022/0417457 A1 * 12/2022 Kim ....................... H04N 25/59
2023/0007163 A1 * 1/2023 Shim ....................... H10F 39/18
2023/0066376 A1 3/2023 Jeong et al.
2023/0101860 A1 3/2023 Moon et al.
2023/0217119 A1 * 7/2023 Lee ...................... G02B 3/0056
348/272
2024/0031698 A1 * 1/2024 Choi .................... H04N 25/778
2024/0387568 A1 * 11/2024 Lee ..................... H10F 39/8053
2025/0015101 A1 * 1/2025 Fowler ................... H04N 25/78

FOREIGN PATENT DOCUMENTS

KR 10-2021-0047738 A 4/2021
KR 10-2021-0135380 A 11/2021
KR 10-2374112 B1 3/2022
KR 10-2022-0086030 A 6/2022
KR 10-2022-0115493 A 8/2022
KR 10-2022-0156332 A 11/2022
KR 10-2022-0159133 A 12/2022

* cited by examiner

IMAGE SENSOR, ELECTRONIC DEVICE INCLUDING IMAGE SENSOR AND OPERATING METHOD THEREOF

CROSS-REFERENCE TO RELATED APPLICATION(S)

This application is a continuation application, claiming priority under 35 U.S.C. § 365 (c), of an International application No. PCT/KR2024/015952, filed on Oct. 21, 2024, which is based on and claims the benefit of a Korean patent application number 10-2023-0156489, filed on Nov. 13, 2023, in the Korean Intellectual Property Office, and of a Korean patent application number 10-2024-0006872, filed on Jan. 16, 2024, in the Korean Intellectual Property Office, the disclosure of each of which is incorporated by reference herein in its entirety.

TECHNICAL FIELD

The disclosure relates to an image sensor, an electronic device including the image sensor and an operating method thereof.

BACKGROUND ART

An electronic device including a device (e.g., a camera) for capturing a subject may perform an operation of focusing on the subject to capture a clear image (e.g., at least one of a still image or a video). For example, the electronic device may perform an operation of moving a position of a lens based on a distance from an image sensor to the subject.

A scheme for focusing on the subject includes a contrast autofocus detection scheme and a phase difference autofocus detection scheme. The contrast autofocus detection scheme may indicate a focusing scheme using features that edges of the subject are sharp and a contrast value is high if the focus is correct, and the contrast is low if the focus is not correct. The contrast detection scheme may include measuring the contrast of at least a part of an image generated on the image sensor by moving a lens assembly, and determining a lens position of maximum contrast as the focused position.

The phase difference focus detection scheme may indicate a scheme for detecting the focus based on at least one of an offset direction or an offset amount by using a phase difference obtained from two or more different phase images. However, the focusing scheme is not limited thereto, and a hybrid method which combines the contrast autofocus detection scheme and the phase difference autofocus detection scheme may be used.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an image sensor, an electronic device including the image sensor and an operating method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a camera module including at least one lens and an image sensor configured to output a signal by detecting light received through the at least one lens, memory storing one or more computer programs, and one or more processors communicatively coupled to camera module and the memory. The image sensor includes a first pixel group including a first micro lens and a second pixel group including a second micro lens. The first pixel group may include a first unit pixel including a first photosensitive element, a second photosensitive element and a third photosensitive element. The first photosensitive element may be disposed to receive at least a part of light passing through the first micro lens. The second photosensitive element may be disposed in a first direction with respect to the first photosensitive element. The third photosensitive element may be disposed in a second direction different from the first direction with respect to the first photosensitive element. The second pixel group may include a second unit pixel including a fourth photosensitive element, a fifth photosensitive element and a sixth photosensitive element. The fourth photosensitive element may be disposed to receive at least a part of light passing through the second micro lens. The fifth photosensitive element may be disposed in the first direction with respect to the fourth photosensitive element. The sixth photosensitive element may be disposed in the second direction with respect to the fourth photosensitive element. The one or more computer programs include computer-executable instructions that, when executed by the one or more processors individually or collectively, cause the electronic device to control the image sensor to read out a signal from the first photosensitive element and the fourth photosensitive element based on a first operation signal. The one or more computer programs include computer-executable instructions that, when executed by the one or more processors individually or collectively, cause the electronic device to control the image sensor to read out a signal from the second photosensitive element and the sixth photosensitive element based on a second operation signal. The one or more computer programs include computer-executable instructions that, when executed by the one or more processors individually or collectively, cause the electronic device to control the image sensor to read out a signal from the third photosensitive element and the fifth photosensitive element based on a third operation signal.

In accordance with an aspect of the disclosure, a method performed by an electronic device including an image sensor which includes a first pixel group including a first photosensitive element, a second photosensitive element and a third photosensitive element, and a second pixel group including a fourth photosensitive element, a fifth photosensitive element and a sixth photosensitive element is provided. The method includes reading, by the electronic device, a signal from the first photosensitive element and the fourth photosensitive element based on a first operation signal, reading, by the electronic device, a signal from the second photosensitive element and the sixth photosensitive element based on a second operation signal, and reading, by the electronic device, a signal from the third photosensitive element and the fifth photosensitive element based on a third operation signal. The first photosensitive element is disposed to receive at least a part of light passing through a first micro lens. The second photosensitive element is disposed in a first direction with respect to the first photosensitive element. The third photosensitive element is disposed in a second direction different from the first direction with respect to the first photosensitive element. The fourth photosensitive element is disposed to receive at least a part of light passing through a second micro lens. The fifth photosensitive element is disposed in the first direction with respect to the fourth photosensitive element. The sixth photosensitive element is disposed in the second direction with respect to the fourth photosensitive element.

In accordance with an aspect of the disclosure, an image sensor is provided. The image sensor includes a first pixel group and a second pixel group. The first pixel group includes a first unit pixel including a first individual pixel, a second individual pixel and a third individual pixel corresponding to a first micro lens. The second individual pixel is disposed in a first direction with respect to the first individual pixel. The third individual pixel is disposed in a second direction different from the first direction with respect to the first individual pixel. The second pixel group includes a second unit pixel including a fourth individual pixel, a fifth individual pixel and a sixth individual pixel corresponding to a second micro lens. The fifth individual pixel is disposed in the first direction with respect to the fourth individual pixel The sixth individual pixel is disposed in the second direction with respect to the fourth individual pixel The first individual pixel and the fourth individual pixel are connected to a first signal line transmitting a first operation signal The second individual pixel and the sixth individual pixel are connected to a second signal line transmitting a second operation signal. The third individual pixel and the fifth individual pixel are connected to a third signal line transmitting a third operation signal.

In accordance with an aspect of the disclosure, one or more non-transitory computer-readable storage media storing one or more computer programs including computer-executable instructions that, when executed by one or more processors of an electronic device individually or collectively, cause the electronic device to perform operations, the electronic device including an image sensor which includes a first pixel group including a first photosensitive element, a second photosensitive element and a third photosensitive element, and a second pixel group including a fourth photosensitive element, a fifth photosensitive element and a sixth photosensitive element are provided. The operations including reading, by the electronic device, a signal from the first photosensitive element and the fourth photosensitive element based on a first operation signal, reading, by the electronic device, a signal from the second photosensitive element and the sixth photosensitive element based on a second operation signal, and reading, by the electronic device, a signal from the third photosensitive element and the fifth photosensitive element based on a third operation signal, wherein the first photosensitive element is disposed to receive at least a part of light passing through a first micro lens, wherein the second photosensitive element is disposed in a first direction with respect to the first photosensitive element, wherein the third photosensitive element is disposed in a second direction different from the first direction with respect to the first photosensitive element, wherein the fourth photosensitive element is disposed to receive at least a part of light passing through a second micro lens, wherein the fifth photosensitive element is disposed in the first direction with respect to the fourth photosensitive element, and wherein the sixth photosensitive element is disposed in the second direction with respect to the fourth photosensitive element.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

MODE FOR INVENTION

Figure 1:
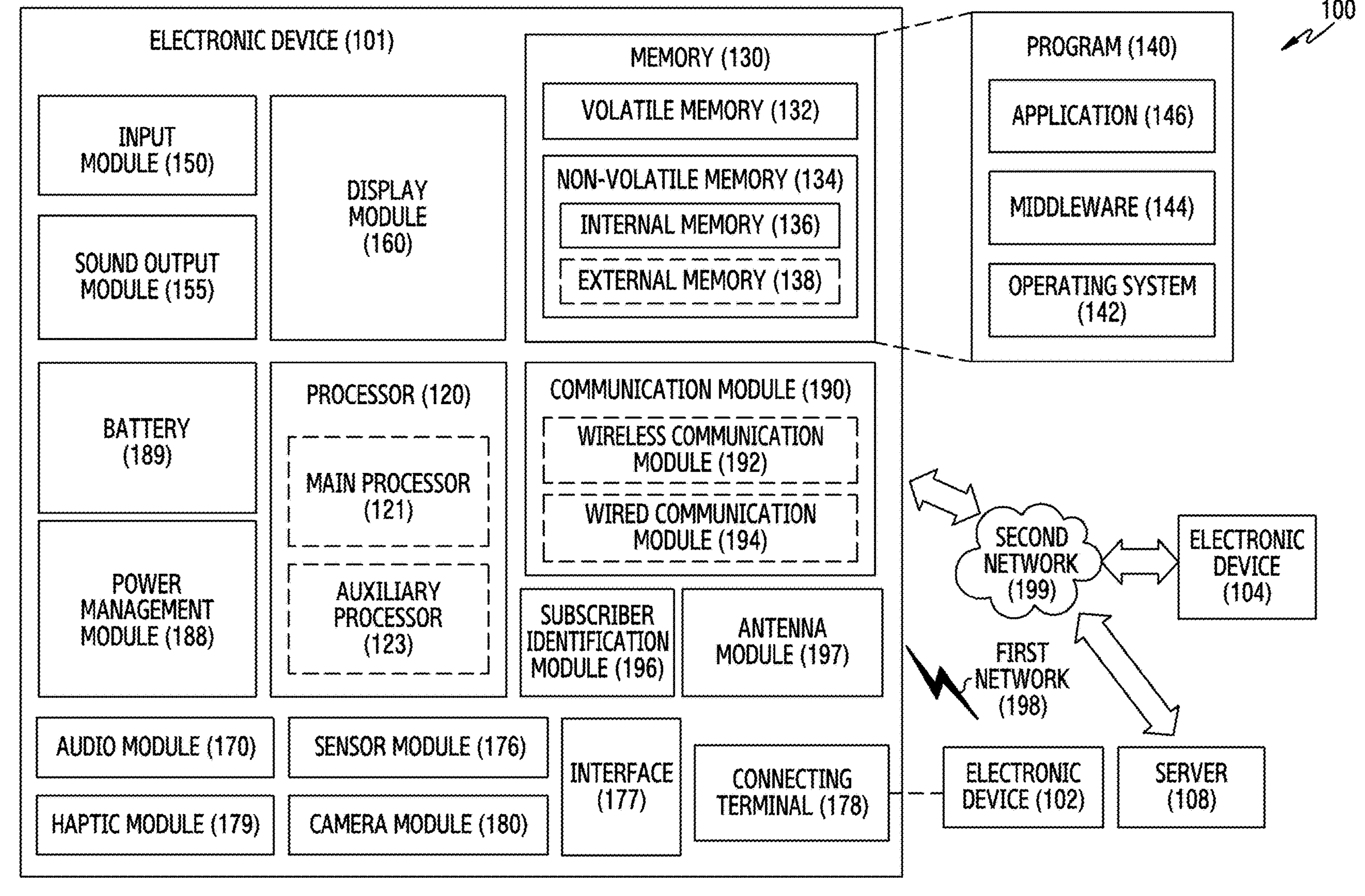
FIG. 1 is a block diagram of an electronic device in a networked environment according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

An embodiment may provide an image sensor for phase detection to detect a focus according to a phase difference focus detection scheme, an electronic device including the image sensor, and an operation method thereof. As the image sensor outputs information having a great number of pixels, an image having a high resolution may be obtained but high power consumption may be required due to the considerable output of the image sensor. Hence, if the number of analog to digital converter (ADC) operations increases for the phase detection, high power consumption may be required. The image sensor, the electronic device including the image sensor, and the operating method thereof according to an embodiment may provide data for the phase detection and reduce the output amount required from the image sensor.

In addition, if the number of the ADC operations increases, the number of frames which may be outputted by the image sensor per hour decreases and accordingly a frame rate which the image sensor may provide may be lowered. The image sensor, the electronic device including the image sensor, and the operating method thereof according to an embodiment may provide data for the phase detection and prevent loss of the frame rate.

The technical problems to be achieved in the disclosure are not limited to the technical problems mentioned above, and other technical problems not mentioned may be clearly understood by those skilled in the art of the technical field which the disclosure belongs to.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 is a block diagram illustrating an electronic device in a network environment according to various embodiments of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
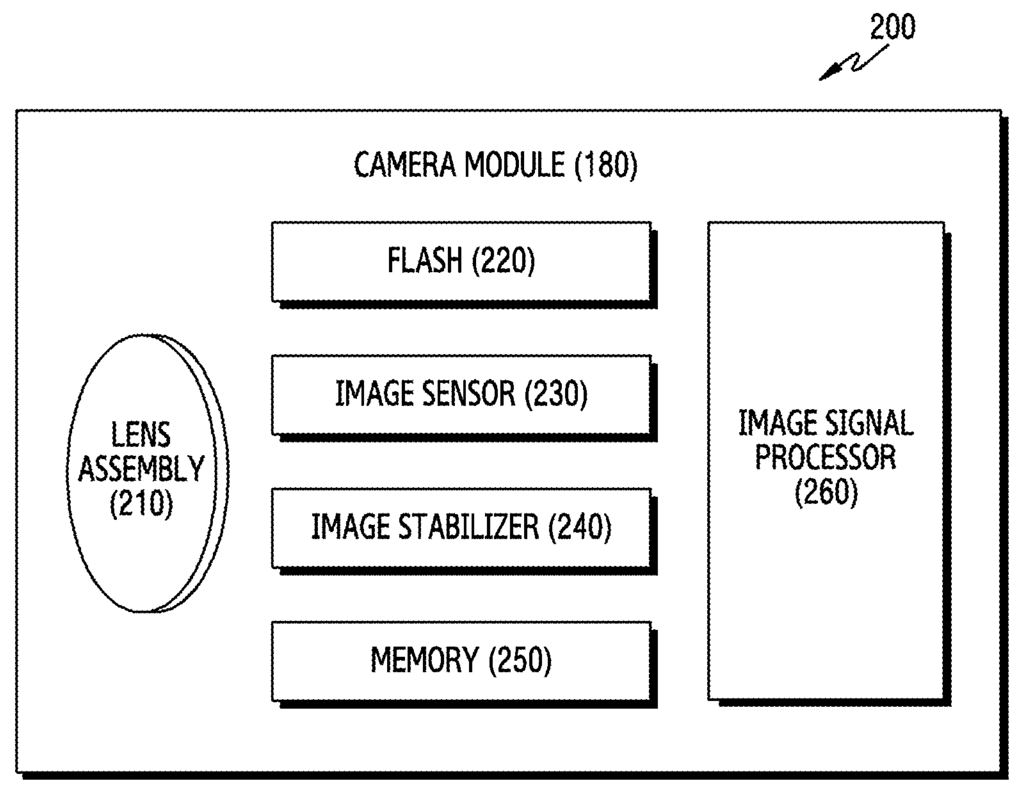
FIG. 2 is a block diagram illustrating a camera module according to various embodiments of the disclosure.

FIG. 2 is a block diagram illustrating the camera module 180 according to various embodiments of the disclosure.

Referring to FIG. 2, in a block diagram 200, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to yet another embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 forms, for example, a front camera and at least another of the plurality of camera modules 180 may form a rear camera.

Figure 3:
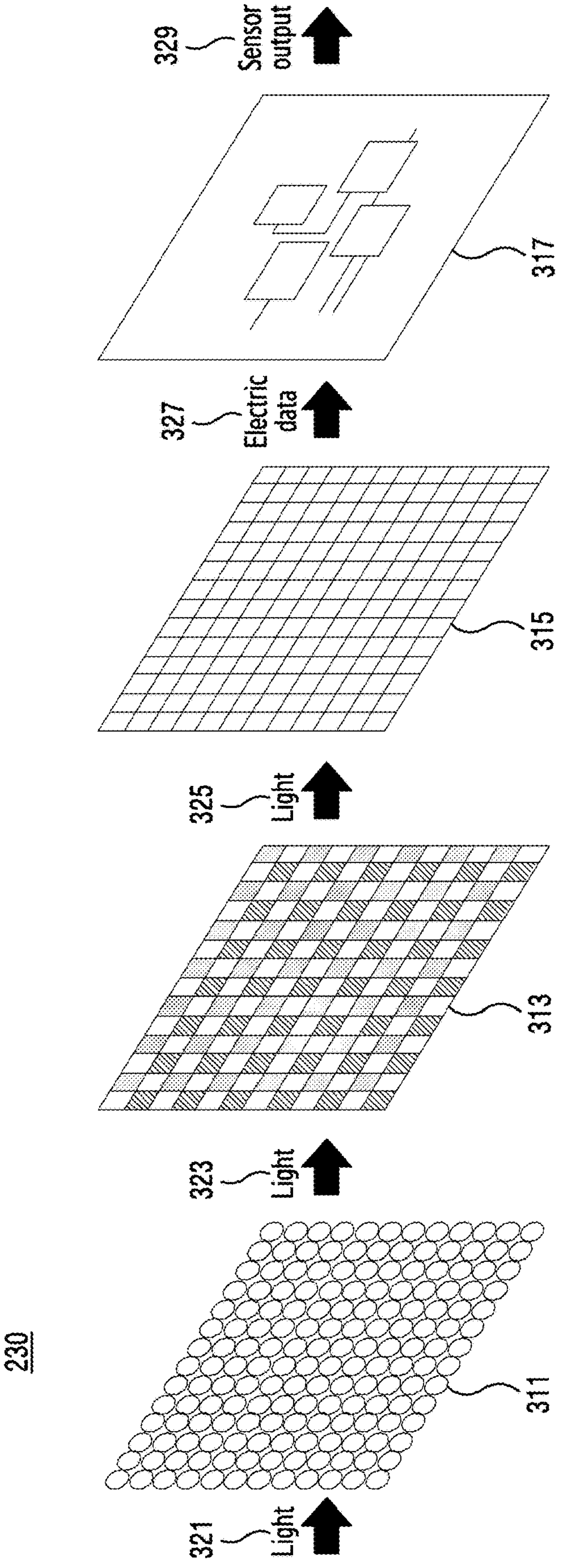
FIG. 3 is a diagram conceptually illustrating a configuration of an image sensor according to an embodiment of the disclosure.

FIG. 3 is a diagram conceptually illustrating a configuration of an image sensor according to an embodiment of the disclosure.

Referring to FIG. 3, the image sensor 230 may include a micro lens array (MLA) 311, a color filter array (CFA) 313, a light receiving unit 315 and a computation unit 317.

In an embodiment, the MLA 311 may be disposed to collect a light bundle 321 passing through a lens assembly (e.g., the lens assembly 210 of FIG. 2) and forming an image on the image sensor 230 at a light receiving element of the light receiving unit 315. A light bundle 323 passing through the MLA 311 may be blocked in at least a part of other wavelength than a bandwidth corresponding to a specific color while passing through the CFA 313. For example, the CFA may be disposed at positions corresponding to pixels of the image sensor 230. Light bundles 325 passing through the CFA 313 may be detected by the light receiving element (e.g., a photodiode) of the light receiving unit 315. The light receiving unit 315 may include the light receiving element for, upon receiving light, generating and converting an electric charge into an electrical signal and a circuit for reading the charge from the light receiving element. A circuit for digitizing the signal read at the light receiving unit 315 or reducing noise may be disposed between the light receiving unit 315 and the computation unit 317.

In an embodiment, the computation unit 317 may process electric data (or a signal) 327 outputted from the light receiving unit 315. The computation unit 317 may output data 329 acquired based on a computation result. The computation unit 317 may output data obtained based on a computation result. The output of the computation unit 317 may be an output of the image sensor 230.

In an embodiment, the computation unit 317 may calibrate the read data as the computation for processing the electric data 327. For example, the computation performed by the computation unit 317 may include at least one of computation for reducing deviations between pixels due to optical features or relative positions of the pixels within the sensor, computation for reducing noise in an analog signal, computation for removing a defect, computation for performing remosaic, or computation for applying to a particular application (e.g., a proximity sensor function, a timing adjustment function, a high dynamic range (HDR) tone mapping function).

In an embodiment, an electronic device (e.g., the electronic device 101 of FIG. 1) may input the computation performed by the computation unit 317 to other processor (e.g., an application processor (AP), a central processing unit (CPU), a graphics processing unit (GPU), a neural processing unit (NPU), an image signal processor (ISP)).

FIG. 3 illustrates that, but not limited to, the number of the micro lenses included in the MLA 311 is equal to the number of the light receiving elements of the light receiving unit 315. In an embodiment, a plurality of light receiving elements may be disposed at a position for receiving light through a single micro lens.

Figure 4:
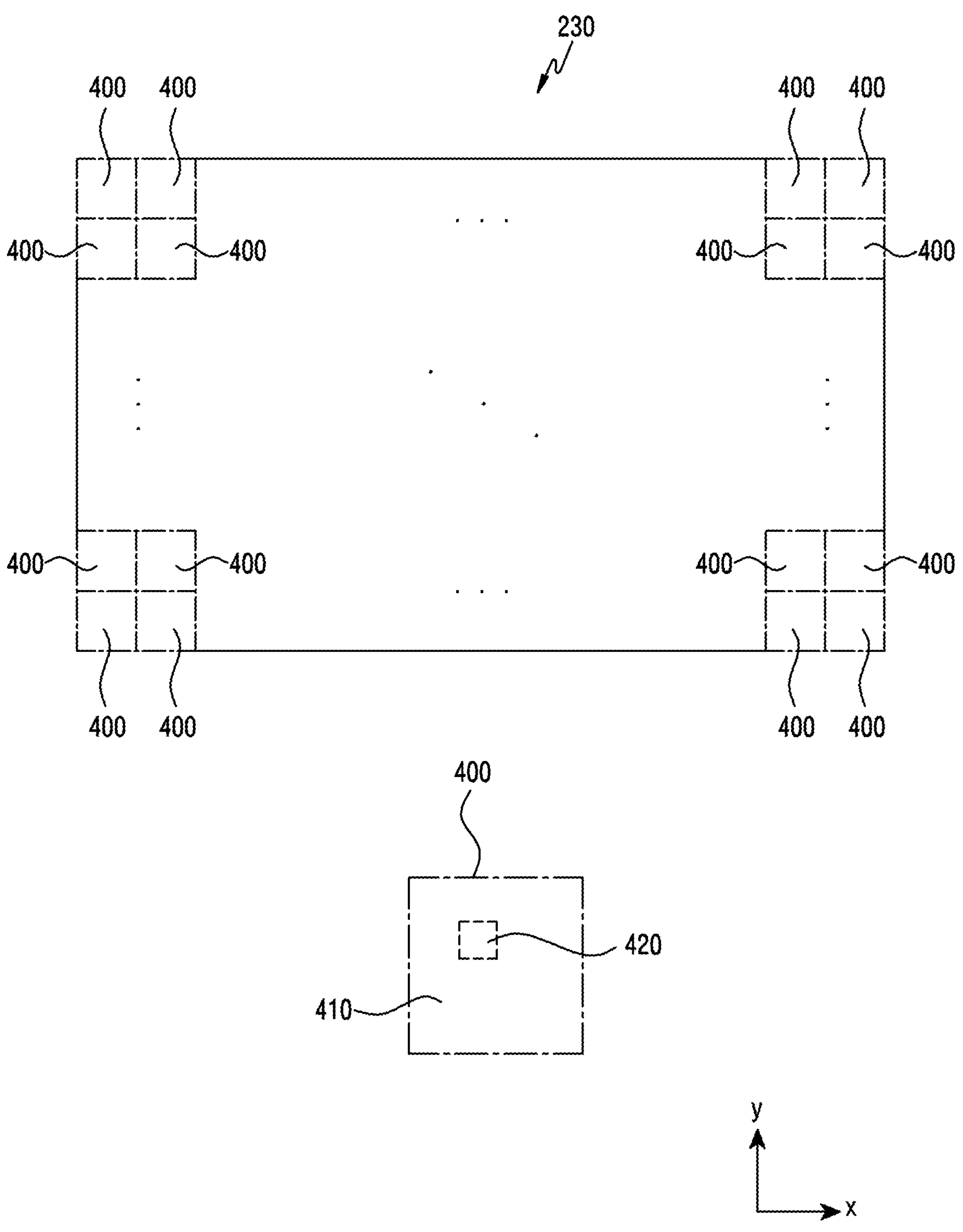
FIG. 4 is a diagram illustrating an example of a first region including a first pixel group and a second region including a second pixel group in a unit region of an image sensor according to an embodiment of the disclosure.

FIG. 4 is a diagram illustrating an example of a first region including a first pixel group and a second region including a second pixel group in a unit region of an image sensor according to an embodiment of the disclosure.

Referring to FIG. 4, the image sensor 230 may include one or more unit regions 400. The unit region 400 may indicate a region which is one unit if the image sensor 230 reads phase difference information. In an embodiment, the image sensor 230 may output a first phase difference data value for a first direction 7 and a second phase difference data value for a second direction in each unit region 400.

In an embodiment, the unit region 400 of the image sensor 230 may include a first region 410 and a second region 420. The unit region 400 may indicate a region corresponding to one unit of phase difference data outputted by the image sensor 230. For example, the image sensor 230 according to an embodiment may output at least one value corresponding to one unit of the first phase difference data and one unit of the second phase difference data from one unit region. The electronic device (e.g., the electronic device 101 of FIG. 1) may perform an autofocus function based on at least one of the first phase difference data or the second phase difference data obtained from the unit regions included in a region of interest among the plurality of unit regions 400.

In an embodiment, the first region 410 may include a first pixel group including at least one first unit pixel configured to output first phase difference data corresponding to a first direction (e.g., an x-axis direction). In an embodiment, the second region 420 may include a second pixel group including at least one second unit pixel configured to output second phase difference data corresponding to a second direction (e.g., a y-axis direction). In an embodiment, the image sensor 230 may be configured such that first pixel groups disposed in the first region 410 output the second phase difference data corresponding to the second direction, and second pixel groups disposed in the second region 420 output the first phase difference data corresponding to the first direction.

Figure 5:
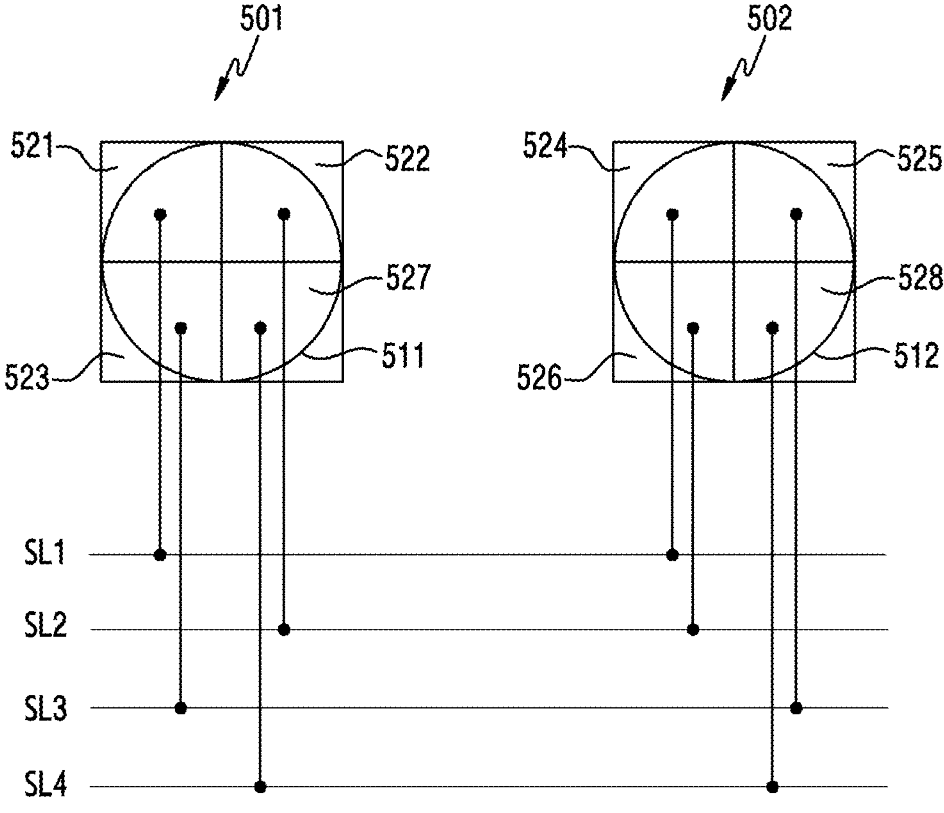
FIG. 5 is a diagram illustrating connections between individual pixels of a first pixel group and individual pixels of a second pixel group and signal lines according to an embodiment of the disclosure.
Figure 5:
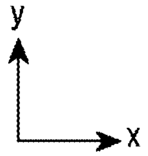

FIG. 5 is a diagram illustrating connections between individual pixels of a first pixel group and individual pixels of a second pixel group and signal lines SL1, SL2, SL3, and SL4 according to an embodiment of the disclosure.

In the disclosure, a unit pixel included in a pixel group of an image sensor (e.g., the image sensor 230 of FIGS. 2, 3, and 4) may include individual pixels corresponding to a micro lens. The individual pixels may be disposed to receive at least a part of the light passing through the micro lens. For example, the unit pixel may include a plurality of photosensitive elements arranged in an N×N array to correspond to one micro lens. N may be greater than or equal to 2. However, the arrangement of the photosensitive elements is not limited thereto.

Referring to FIG. 5, a first unit pixel 501 included in the first pixel group may include a first individual pixel, a second individual pixel and a third individual pixel corresponding to a first micro lens 511. The first unit pixel 501 may include three or more photosensitive elements configuring the first individual pixel, the second individual pixel and the third individual pixel. In an embodiment, a second unit pixel 502 included in the second pixel group may include a fourth individual pixel, a fifth individual pixel and a sixth individual pixel corresponding to a second micro lens 512. The second unit pixel 502 may include three or more photosensitive elements configuring the fourth individual pixel, the fifth individual pixel and the sixth individual pixel.

In an embodiment, the individual pixel may include the photosensitive element for detecting light and outputting a signal. For example, the photosensitive element may include a photo diode, a pinned-photodiode, a phototransistor, or a photogate. However, the photosensitive element is not limited to the examples mentioned above. The first individual pixel may include a first photosensitive element 521 disposed to receive at least a part of the light passing through the first micro lens 511. The second individual pixel may include a second photosensitive element 522 disposed in the first direction (e.g., a +x-axis direction) with respect to the first photosensitive element 521. The third individual pixel may include a third photosensitive element 523 disposed in the second direction (e.g., a −y-axis direction) with respect to the first photosensitive element 521. The fourth individual pixel may include a fourth photosensitive element 524 disposed to receive at least a part of the light passing through the second micro lens 512. The fifth individual pixel may include a fifth photosensitive element 525 disposed in the first direction (e.g., the +x-axis direction) with respect to the fourth photosensitive element 524. The sixth individual pixel may include a sixth photosensitive element 526 disposed in the second direction (e.g., the −y-axis direction) with respect to the fourth photosensitive element 524.

In an embodiment, the first individual pixel and the fourth individual pixel may be connected to the first signal line SL1 which carries a first operation signal. The image sensor according to an embodiment may be configured to read signals from the first photosensitive element 521 and the fourth photosensitive element 524 based on the first operation signal fed through the first signal line SL1. In an embodiment, the second individual pixel and the sixth individual pixel may be connected to the second signal line SL2 which carries a second operation signal. The image sensor according to an embodiment may be configured to read signals from the second photosensitive element 522 and the sixth photosensitive element 526 based on the second operation signal fed through the second signal line SL2. In an embodiment, the third individual pixel and the fifth individual pixel may be connected to the third signal line SL3. The image sensor according to an embodiment may be configured to read signals from the third photosensitive element 523 and the fifth photosensitive element 525 based on a third operation signal fed through the third signal line SL3.

In an embodiment, the first unit pixel 501 may include a seventh individual pixel. The second unit pixel 502 may include an eighth individual pixel. The seventh individual pixel may further include a seventh photosensitive element 527 disposed in the second direction (e.g., the −y direction) with respect to the second photosensitive element 522, and in the first direction (e.g., the +x direction) with respect to the third photosensitive element 523. The eighth individual pixel may further include an eighth photosensitive element 528 disposed in the second direction (e.g., the −y direction) with respect to the fifth photosensitive element 525, and in the first direction (e.g., the +x direction) with respect to the sixth photosensitive element 526. The seventh individual pixel and the eighth individual pixel may be connected to the fourth signal line SL4. The image sensor according to an embodiment may be configured to read signals from the seventh photosensitive element 527 and the eighth photosensitive element 528 based on a fourth operation signal fed through the fourth signal line SL4.

Figure 6:
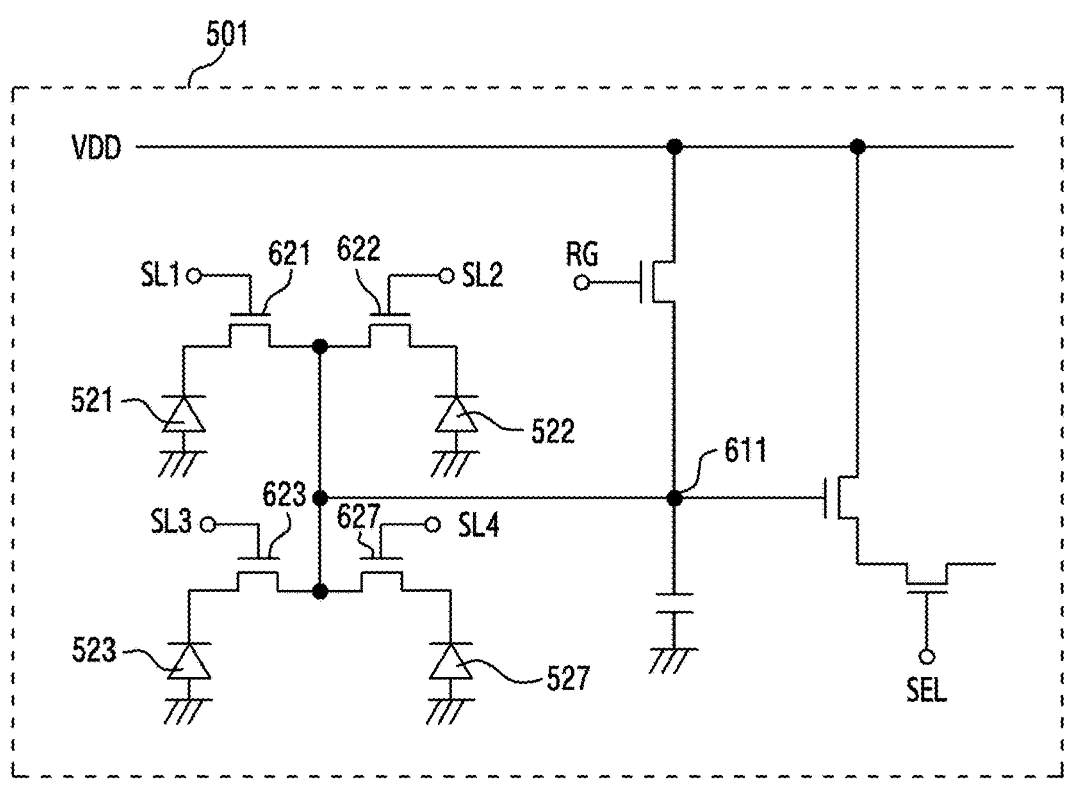
FIG. 6 is a circuit diagram illustrating a circuit configuring at least a part of a first unit pixel of a first pixel group and a circuit configuring at least a part of a second unit pixel of a second pixel group according to an embodiment of the disclosure.
Figure 6:
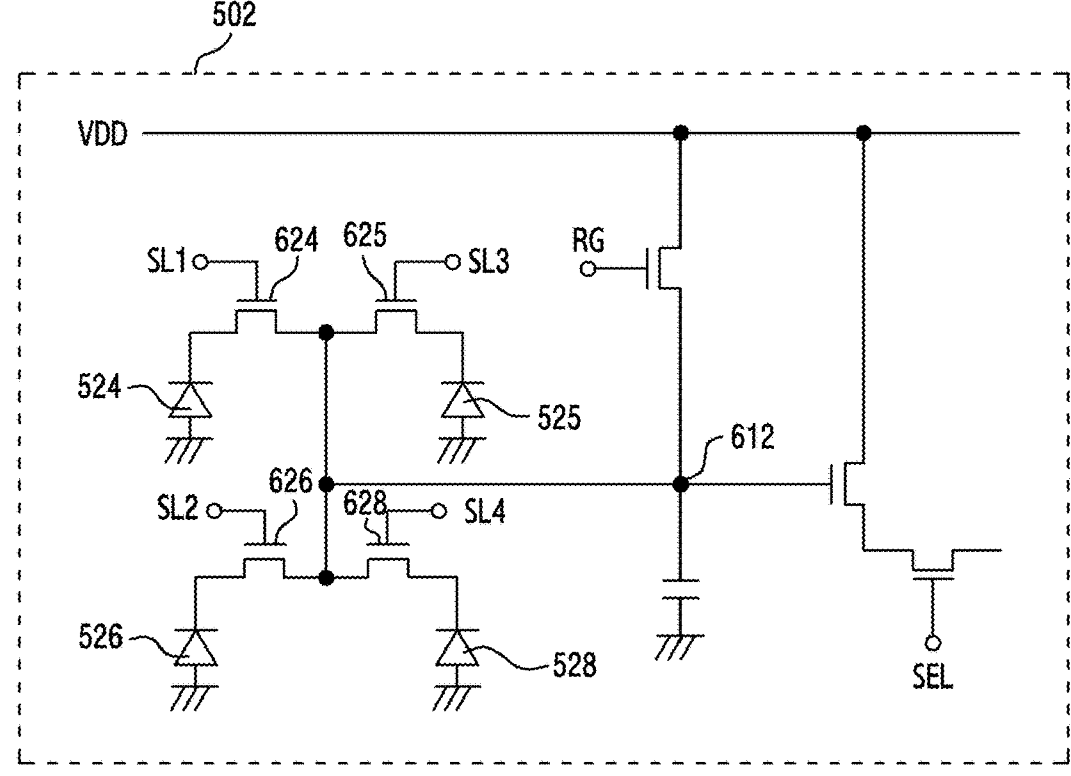

FIG. 6 is a circuit diagram illustrating a circuit configuring at least a part of a first unit pixel of a first pixel group and a circuit configuring at least a part of a second unit pixel of a second pixel group according to an embodiment of the disclosure.

In an embodiment, an image sensor (e.g., the image sensor 230 of FIGS. 2 through 4) may have a structure for reading a pixel value of at least one individual pixel through a floating diffusion node. FIG. 6 illustrates a structure in which four individual pixels within a unit pixel share a single floating diffusion node. However, it is not limited thereto. For example, the image sensor may be configured to have a structure in which a higher number of individual pixels (e.g., eight individual pixels in two unit pixels) share a single floating diffusion node. FIG. 6 illustrates the structure in which one unit pixel includes four individual pixels (four photosensitive elements), but the number of the individual pixels included in the unit pixel is not limited thereto. For example, one unit pixel includes nine individual pixels.

Referring to FIG. 6, a first unit pixel 501 may include a first photosensitive element 521, a second photosensitive element 522 and a third photosensitive element 523. The first unit pixel 501 may include a first switch 621 connected between the first photosensitive element 521 and a first floating diffusion node 611. The first unit pixel 501 may include a second switch 622 connected between the second photosensitive element 522 and the first floating diffusion node 611. The first unit pixel 501 may include a third switch 623 connected between the third photosensitive element 523 and the first floating diffusion node 611.

In an embodiment, the first switch 621 may transmit charge generated by the first photosensitive element 521 to the first floating diffusion node 611 based on a first operation signal fed through a first signal line SL1. The second switch 622 may transmit charge generated by the second photosensitive element 522 to the first floating diffusion node 611 based on a second operation signal fed through a second signal line SL2. The third switch 623 may transmit charge generated by the third photosensitive element 523 to the first floating diffusion node 611 based on a third operation signal fed through a third signal line SL3. A voltage based on the charge transmitted to the first floating diffusion node 611 may be read based on a selector signal (SEL) for reading a signal of a corresponding line.

In an embodiment, when the first floating diffusion node 611 of the first unit pixel is connected to a drain voltage VDD by a reset signal RG, the charges accumulated in the first floating diffusion node 611 may be reset. The photosensitive element may be also reset by the reset signal RG. For example, referring to FIG. 7, at a timing t1, each of the photosensitive elements (e.g., the first photosensitive element 521, the second photosensitive element 522, the third photosensitive element 523 and the seventh photosensitive element 527) may be also reset by the reset signal RG.

In an embodiment, a second unit pixel 502 may include a fourth photosensitive element 524, a fifth photosensitive element 525 and a sixth photosensitive element 526. The second unit pixel 502 may include a fourth switch 624 connected between the fourth photosensitive element 524 and a second floating diffusion node 612. The second unit pixel 502 may include a fifth switch 625 connected between the fifth photosensitive element 525 and the second floating diffusion node 612. The second unit pixel 502 may include a sixth switch 626 connected between the sixth photosensitive element 526 and the second floating diffusion node 612.

In an embodiment, the fourth switch 624 may transmit charge generated by the fourth photosensitive element 524 to the second floating diffusion node 612 based on the first operation signal fed through the first signal line SL1. The fifth switch 625 may transmit charge generated by the fifth photosensitive element 525 to the second floating diffusion node 612 based on the third operation signal fed through the third signal line SL3. The sixth switch 626 may transmit charge generated by the sixth photosensitive element 526 to the second floating diffusion node 612 based on the second operation signal fed through the second signal line SL2.

In an embodiment, the first unit pixel 501 may further include a seventh photosensitive element 527. The first unit pixel 501 may further include a seventh switch 627 connected between the seventh photosensitive element 527 and the first floating diffusion node 611. The second unit pixel 502 may further include an eighth photosensitive element 528. The second unit pixel 502 may further include an eighth switch 628 connected between the eighth photosensitive element 528 and the second floating diffusion node 612. The seventh switch 627 and the eighth switch 628 may be configured to transmit a signal generated by the photosensitive element to the floating diffusion node in response to a fourth operation signal fed through a fourth signal line SL4. The seventh switch 627 may be configured to transmit charge generated by the seventh photosensitive element 527 to the first floating diffusion node 611 based on the fourth operation signal. The eighth switch 628 may be configured to transmit charge generated by the eighth photosensitive element 528 to the second floating diffusion node 612 based on the fourth operation signal. A voltage based on the charge transmitted to the second floating diffusion node 612 may be read based on the selector signal (SEL) for reading a signal of a corresponding line.

In an embodiment, when the second floating diffusion node 612 of the second unit pixel 502 is connected to the drain voltage VDD by the reset signal RG, the charges accumulated in the second floating diffusion node 612 may be reset.

In an embodiment, each of the switches 621, 622, 623, 624, 625, 626, 627, and 628 shown in FIG. 6 may include an element configured to close based on the operation signal. For example, each of the switches 621, 622, 623, 624, 625, 626, 627, and 628 may include at least one transistor.

Figure 7:
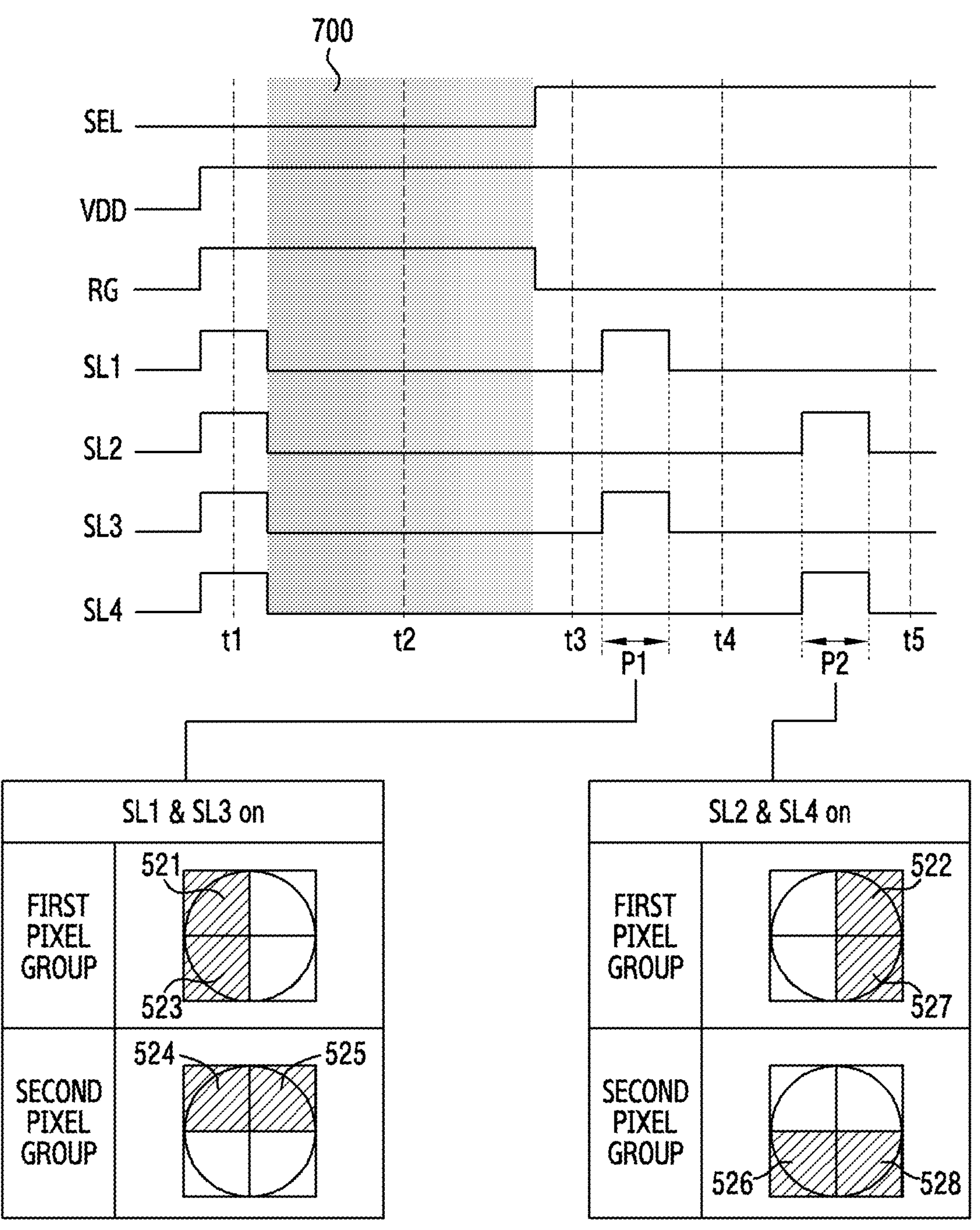
FIG. 7 is a diagram illustrating a timeline showing a signal for operating pixels included in an image sensor and operations of pixels in a signal period according to an embodiment of the disclosure.

FIG. 7 is a diagram illustrating a timeline showing a signal for operating pixels included in an image sensor (e.g., the image sensor 230 of FIGS. 2 through 4) and operations of the pixels in a signal period according to an embodiment of the disclosure.

FIG. 7 illustrates an operational example for illustrating the operation of the image sensor according to an embodiment, and is not necessarily limited to reading output values of the pixels according to the signal timeline shown in FIG. 7.

Referring to FIG. 7, the image sensor (e.g., the image sensor 230 of FIGS. 2 through 4) according to an embodiment may reset pixels based on signals for performing the reset operation at the first timing t1. With the reset signal RG turned on, charges accumulated at a floating diffusion node (e.g., the first floating diffusion node 611, the second floating diffusion node 612 of FIG. 6) may be removed. With the pixels being reset, the image sensor may perform an exposure operation for exposing each of the pixels to the light in an exposure period 700 including a second timing 12.

In an embodiment, during a first time period P1 after the exposure period 700 (or, after a third timing 13), the image sensor may read signals (or phase data) based on the first operation signal transmitted through the first signal line SL1 and the third operation signal transmitted through the third signal line SL3. In the first time period P1, the image sensor may convert a first voltage detected while first charge generated by the first photosensitive element 521 (the first individual pixel) and third charge generated by the third photosensitive element 523 (the third individual pixel) move from the first unit pixel included in the first pixel group to the first floating diffusion node, into a first digital value. In the first time period P1, the image sensor may convert a second voltage detected while fourth charge generated by the fourth photosensitive element 524 (the fourth individual pixel) and fifth charge generated by the fifth photosensitive element 525 (the fifth individual pixel) move from the second unit pixel included in the second pixel group to the second floating diffusion node, into a second digital value.

In an embodiment, during a second time period P2 after a fourth timing 14, the image sensor may read signals (or phase data) based on the second operation signal transmitted through the second signal line SL2 and the fourth operation signal transmitted through the fourth signal line SL4. In the second time period P2, the image sensor may convert (analog to digital converting (ADC)) a third voltage detected while second charge generated by the second photosensitive element 522 (the second individual pixel) and seventh charge generated by the seventh photosensitive element 527 (the seventh individual pixel) move from the first unit pixel included in the first pixel group to the first floating diffusion node, into a third digital value. In the second time period P2, the image sensor may convert a fourth voltage detected while sixth charge generated by the sixth photosensitive element 526 (the sixth individual pixel) and eighth charge generated by the eighth photosensitive element 528 (the eighth individual pixel) move from the second unit pixel included in the second pixel group to the second floating diffusion node, into a fourth digital value.

In an embodiment, the first voltage and the third voltage may be voltages detected through a source follower from a voltage of the first floating diffusion node 611 included in the first unit pixel (e.g., the first unit pixel 501 of FIG. 5). The second voltage and the fourth voltage may be voltages detected through the source follower from a voltage of the second floating diffusion node 612 included in the second unit pixel (e.g., the second unit pixel 502 of FIG. 5).

In an embodiment, the electronic device (e.g., the electronic device 101 of FIG. 1) including the image sensor may obtain first phase data based on the first digital value. The electronic device may obtain second phase data based on a difference of the third digital value and the first digital value. The electronic device may obtain first phase difference data for the first direction (e.g., a horizontal direction) based on a correlation operation on the first phase data and the second phase data. The electronic device including the image sensor may obtain third phase data based on the second digital value. The electronic device may obtain fourth phase data based on a difference of the fourth digital value and the second digital value. The electronic device may obtain second phase difference data for the second direction (e.g., a vertical direction) based on a correlation operation on the third phase data and the fourth phase data. Hence, the electronic device may acquire the first phase difference data and the second phase difference data together without separately performing the reading operation for obtaining the first phase difference data and the reading operation for obtaining the second phase difference data.

Figure 8:
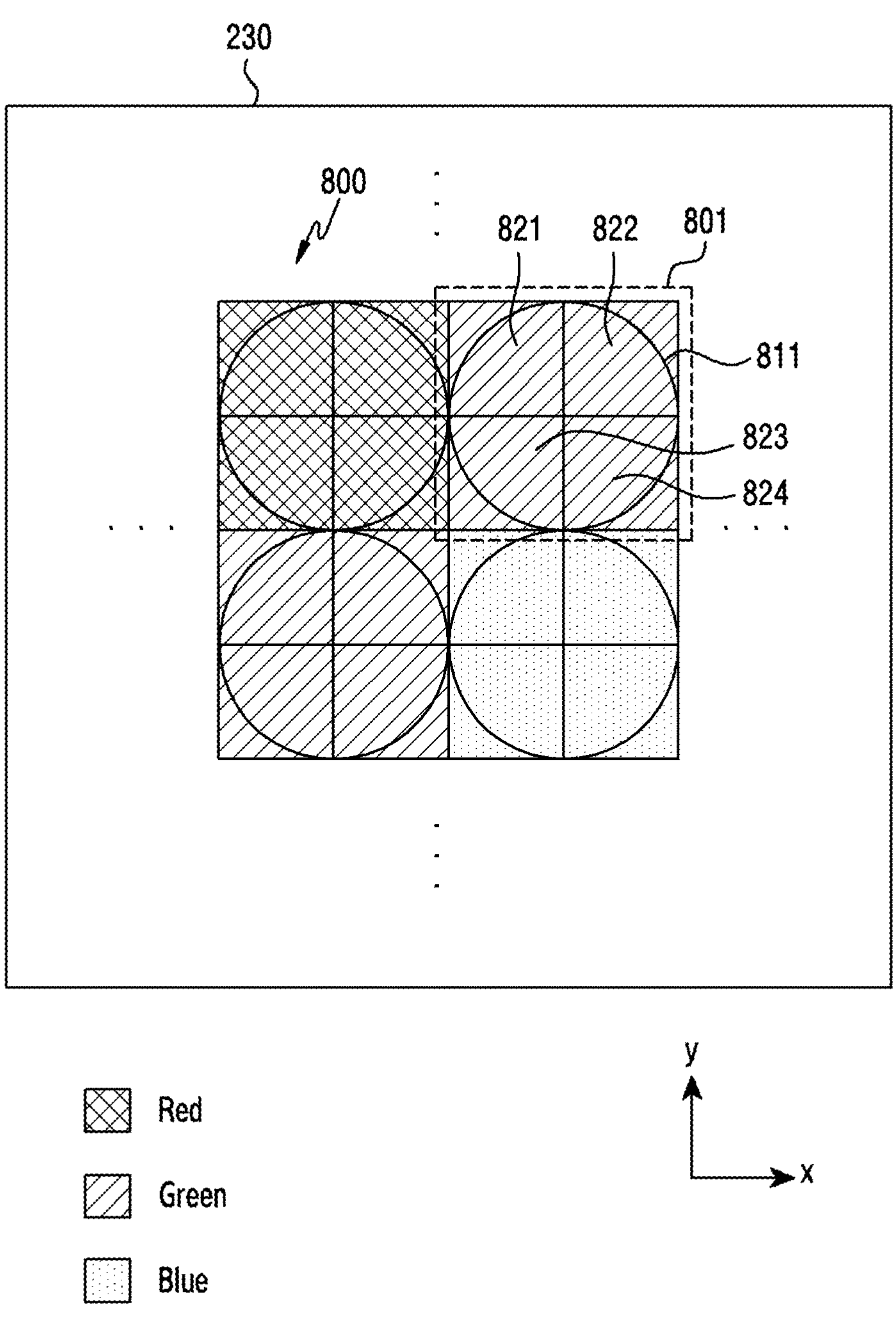
FIG. 8 is a diagram illustrating an example of a first pattern included in an image sensor according to an embodiment of the disclosure.

FIG. 8 is a diagram illustrating an example of a first pattern included in an image sensor (e.g., the image sensor 230 of FIGS. 2 through 4) according to an embodiment of the disclosure.

Referring to FIG. 8, a first pattern 800 may include a color filter array (e.g., the CFA 313 of FIG. 3) configured in a red-green-green-blue (RGGB) pattern. One micro lens 811 (e.g., the MLA 311 of FIG. 3) may be disposed on each color channel of the color filter array. Four light receiving elements 821, 822, 823, and 824 arranged to receive light collected through the micro lens 811 may be disposed at the back of the micro lens 811. The image sensor 230 may configure a unit pixel 801 including each of the light receiving elements 821, 822, 823, and 824 as an individual pixel. The first pattern 800 in which one micro lens and four light receiving elements are disposed in each channel of the color filter array as shown in FIG. 8 may be referred to as a 4photo diode (PD) structure.

In an embodiment, the image sensor 230 may include a pixel array with the first pattern 800 repeated. However, the arrangement structure of the pixels included in the pixel array configuring the image sensor 230 and the color configuration of the color filter are not limited to the first pattern 800.

Figure 9:
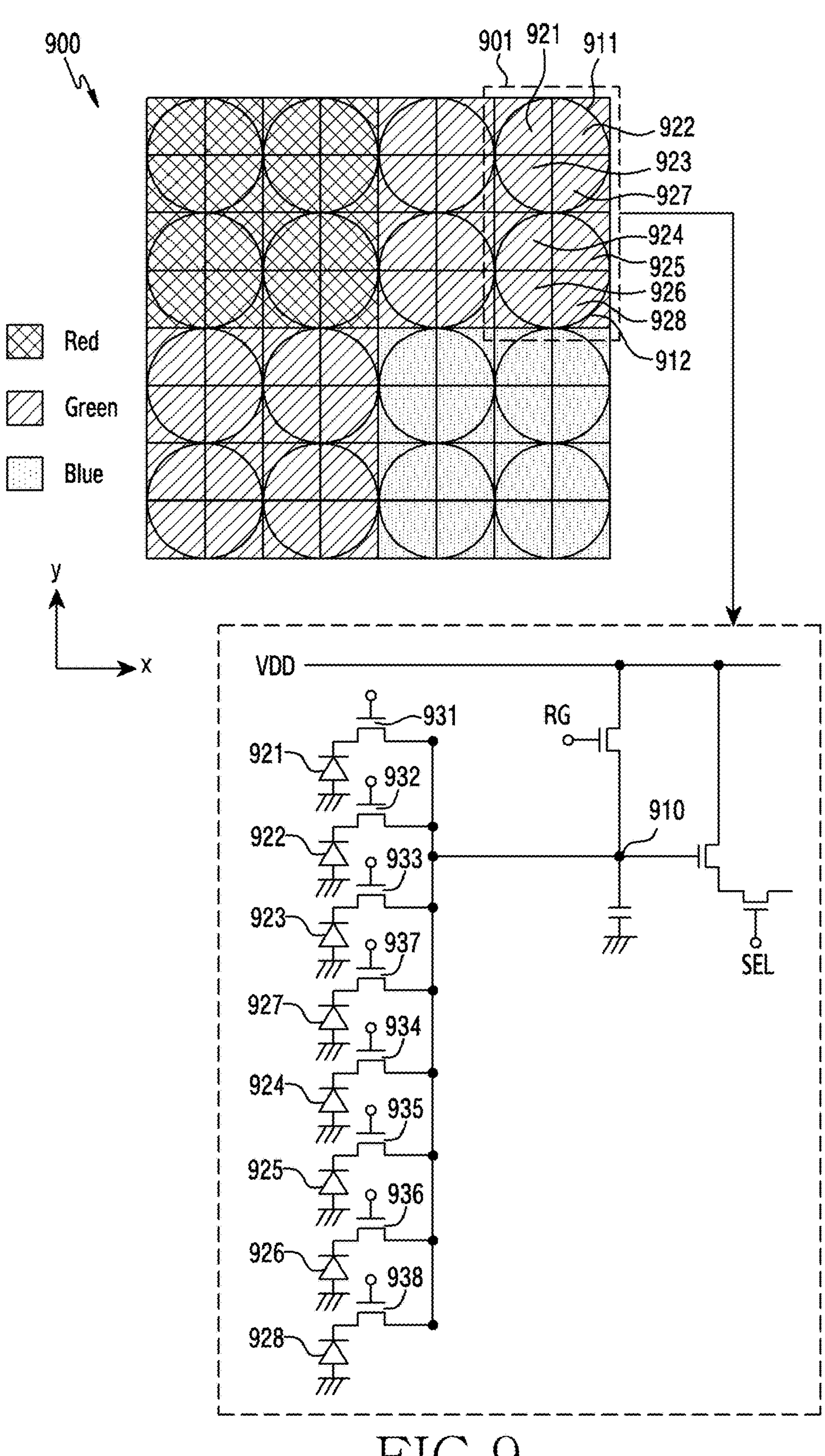
FIG. 9 is a diagram illustrating an example of a second pattern included in an image sensor according to an embodiment of the disclosure.

FIG. 9 is a diagram illustrating an example of a second pattern included in an image sensor according to an embodiment of the disclosure.

Referring to FIG. 9, in a second pattern 900, four micro lenses (e.g., the MLA 311 of FIG. 3) may be disposed for each color channel of an RGGB pattern included in a color filter array (e.g., the CFA 313 of FIG. 3) included in the image sensor 230 of the electronic device (e.g., the electronic device 101 of FIG. 1). Four light receiving elements arranged to receive light may be disposed at the back of each micro lens.

In an embodiment, the image sensor may be configured such that eight individual pixels 901 share a single floating diffusion node 910. Referring to FIG. 9, light receiving elements disposed at positions corresponding to a first micro lens 911 or a second micro lens 912 among micro lenses disposed in a single color channel may be configured to share the floating diffusion node 910. The image sensor may include a first photosensitive element 921, a second photosensitive element 922, a third photosensitive element 923 and a seventh photosensitive element 927 disposed to receive light collected through the first micro lens 911. The image sensor 230 may include a fourth photosensitive element 924, a fifth photosensitive element 925, a sixth photosensitive element 926 and an eighth photosensitive element 928 disposed to receive light collected through the second micro lens 912.

In an embodiment, the image sensor may include a first switch 931 connected between the first photosensitive element 921 and the floating diffusion node 910. The image sensor may include a second switch 932 connected between the second photosensitive element 922 and the floating diffusion node 910. The image sensor may include a third switch 933 connected between the third photosensitive element 923 and the floating diffusion node 910. The image sensor may include a fourth switch 934 connected between the fourth photosensitive element 924 and the floating diffusion node 910. The image sensor may include a fifth switch 935 connected between the fifth photosensitive element 925 and the floating diffusion node 910. The image sensor may include a sixth switch 936 connected between the sixth photosensitive element 926 and the floating diffusion node 910. The image sensor may include a seventh switch 937 connected between the seventh photosensitive element 927 and the floating diffusion node 910. The image sensor may include an eighth switch 938 connected between the eighth photosensitive element 928 and the floating diffusion node 910.

In an embodiment, the image sensor may include a structure in which the second pattern 900 is repeated. In an embodiment where the second pattern 900 is repeatedly arranged, if pixels included in the second pattern 900 are pixels (e.g., first unit pixels) belonging to a first pixel group, the first switch 931 and the fourth switch 934 may be connected to a first signal line (e.g., the first signal line SL1 of FIG. 5) carrying a first operation signal. If the pixels included in the second pattern 900 are pixels (e.g., first unit pixels) belonging to the first pixel group, the second switch 932 and the fifth switch 935 may be connected to a second signal line (e.g., the second signal line SL2 of FIG. 5). If the pixels included in the second pattern 900 are pixels (e.g., first unit pixels) belonging to the first pixel group, the third switch 933 and the sixth switch 936 may be connected to a third signal line (e.g., the third signal line SL3 of FIG. 5). If the pixels included in the second pattern 900 are pixels (e.g., first unit pixels) belonging to the first pixel group, the seventh switch 937 and the eighth switch 938 may be connected to a fourth signal line (e.g., the fourth signal line SL4 of FIG. 5). If the pixels included in the second pattern 900 are pixels (e.g., second unit pixels) belonging to a second pixel group, the first switch 931 and the fourth switch 934 may be connected to the first signal line. If the pixels included in the second pattern 900 are pixels (e.g., second unit pixels) belonging to the second pixel group, the second switch 932 and the fifth switch 935 may be connected to the third signal line. If the pixels included in the second pattern 900 are pixels (e.g., second unit pixels) belonging to the second pixel group, the third switch 933 and the sixth switch 936 may be connected to the second signal line. If the pixels included in the second pattern 900 are pixels (e.g., second unit pixels) belonging to the second pixel group, the seventh switch 937 and the eighth switch 938 may be connected to the fourth signal line. By cross-connecting the signal lines of some individual pixels included in the second pixel group differently from the first pixel group, phase difference data in a different direction from the detection of the first pixel group may be detected from the pixels included in the second pixel group. In an embodiment, if the switch includes a transistor, a gate of the transistor may be connected to the signal line.

Figure 10:
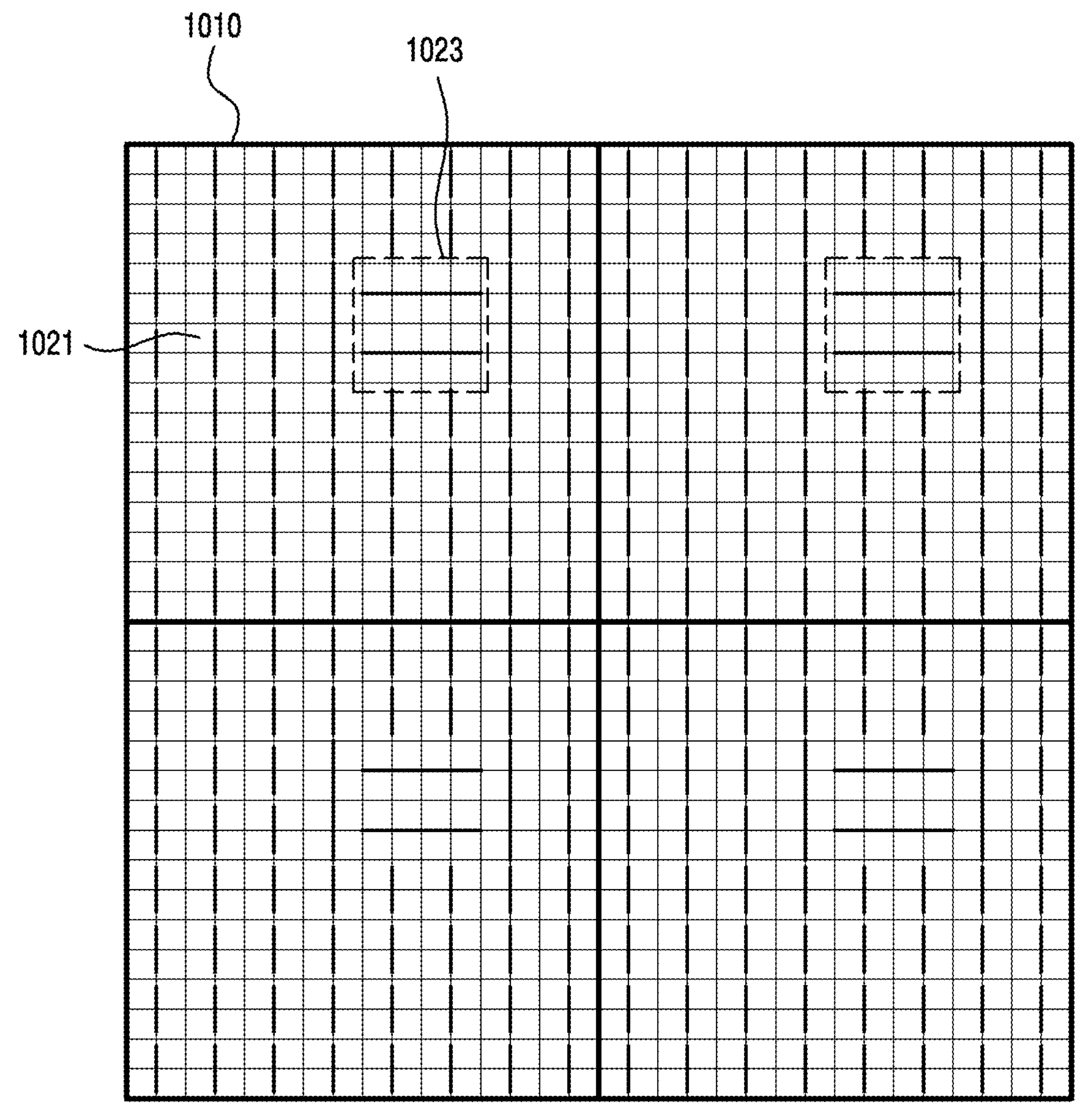
FIG. 10 illustrates an example of arrangement of a first pixel group and a second pixel group in an image sensor according to an embodiment of the disclosure.

FIG. 10 illustrates an example of arrangement of a first pixel group and a second pixel group in an image sensor (e.g., the image sensor 230 of FIG. 2 through 4) according to an embodiment of the disclosure.

Referring to FIG. 10, the image sensor may include a first region 1021 in which unit pixels (e.g., the first unit pixel 501 of FIG. 5) of a first pixel group are disposed and a second region 1023 in which unit pixels (e.g., the second unit pixel 502 of FIG. 5) of a second pixel group are disposed, in each unit region 1010. The image sensor may obtain a value corresponding to a unit of phase difference data from the unit region 1010. The image sensor may obtain first phase difference data related to a phase difference of the first direction from the first pixel group of the first region 1021 of the unit region 1010, and obtain second phase difference data related to a phase difference of the second direction from the second pixel group of the second region 1023.

In an embodiment, the image sensor may repeatedly arrange the unit region 1010 including the first region 1021 and the second region 1023. However, it is not limited thereto. The first pixel group and the second pixel group may be arranged in different forms within a plurality of unit regions included in the image sensor.

Referring to FIG. 10, the second region 1023 may be configured to cluster the unit pixels included in the second pixel group. However, it is not limited thereto. The unit pixels included in the second pixel group may be distributed.

Figure 11:
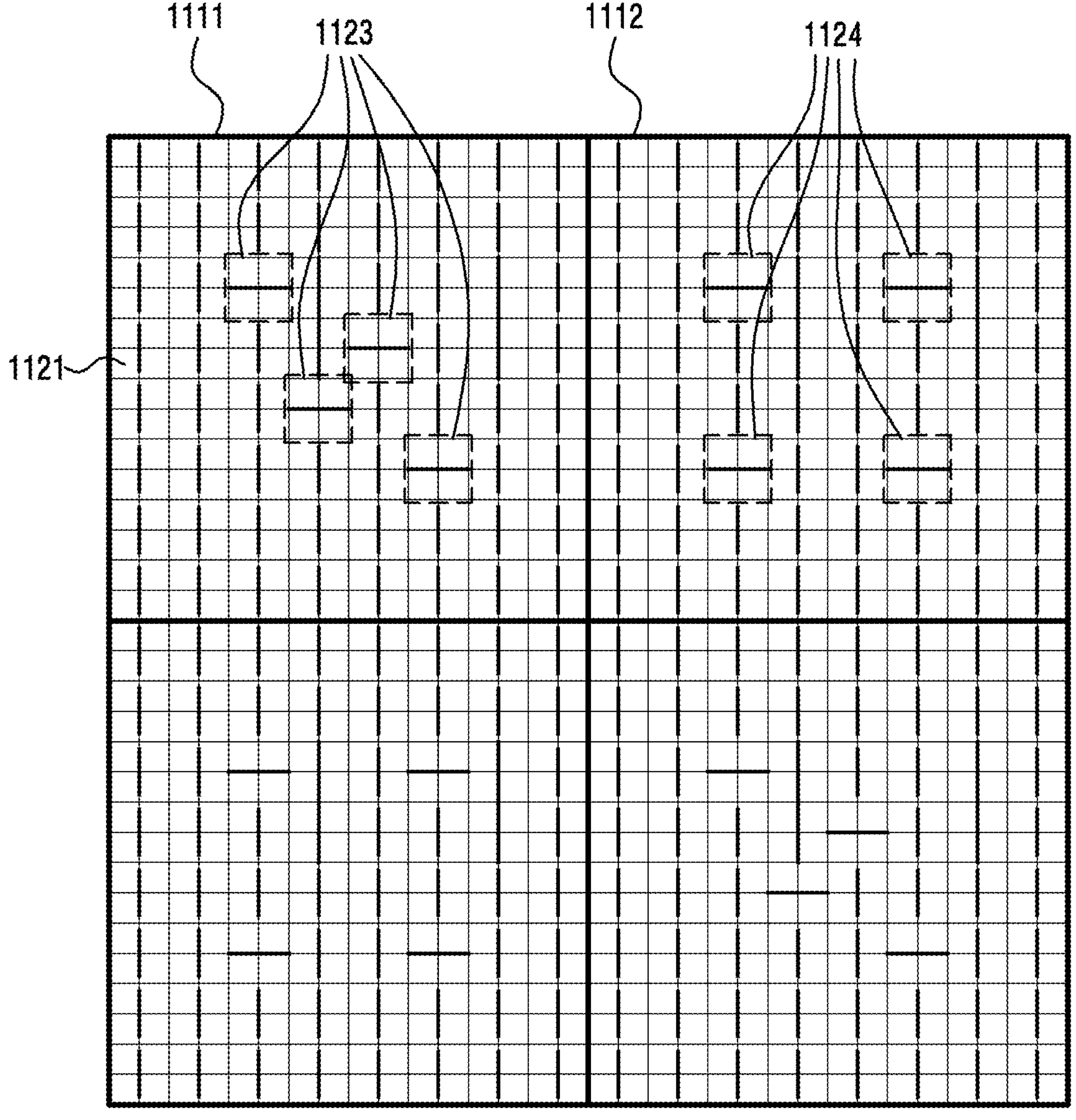
FIG. 11 illustrates an example of arrangement of a first pixel group and a second pixel group in an image sensor according to an embodiment of the disclosure.

FIG. 11 illustrates an example of arrangement of a first pixel group and a second pixel group in an image sensor according to an embodiment of the disclosure.

Referring to FIG. 11, unit pixels in a pixel group of the image sensor may be disposed in a distributed manner. Referring to FIG. 11, a first unit region 1111 may include a second region 1123 in which unit pixels (e.g., the second unit pixel 502 of FIG. 5) of the second pixel group are disposed. Unit pixels (e.g., the first unit pixel 501 of FIG. 5) of the first pixel group may be disposed in other region than the second region 1123 within the first unit region 1111. The region in which the unit pixels of the first pixel group are disposed may be referred to as a first region 1121.

According to an embodiment, positions at which the unit pixels of the second pixel group are disposed within the plurality of unit regions may be different. Referring to FIG. 11, the positions of the second region 1123 disposed within the first unit region 1111 and the third region 1124 disposed within the second unit region 1112 may be different. By configuring the different positions of the second region 1123 disposed in the first unit region 1111 and the third region 1124 disposed in the second unit region 1112, it is possible to reduce an effect of fixed pattern noise on the readout result of the image sensor.

In yet an embodiment, even if the arrangement of the unit pixels is distributed, the image sensor may be configured such that a ratio of color channels corresponding to the unit pixels included in each pixel group is maintained as a ratio of color channels included in the pattern configured for the image sensor. For example, if the image sensor is configured based on the pattern 800 shown in FIG. 8, the ratio of the number of pixels in a red channel, the number of pixels in a green channel, and the number of pixels in a blue channel among the unit pixels included in the second pixel group may be 1:2:1. If the image sensor according to an embodiment has other arrangement structure (e.g., the arrangement structure shown in FIG. 10, FIG. 12, FIG. 13 or FIG. 14) than the arrangement structure of the unit pixels shown in FIG. 11, it may be configured to maintain the ratio of the color channels of each pixel group of the image sensor.

Figure 12:
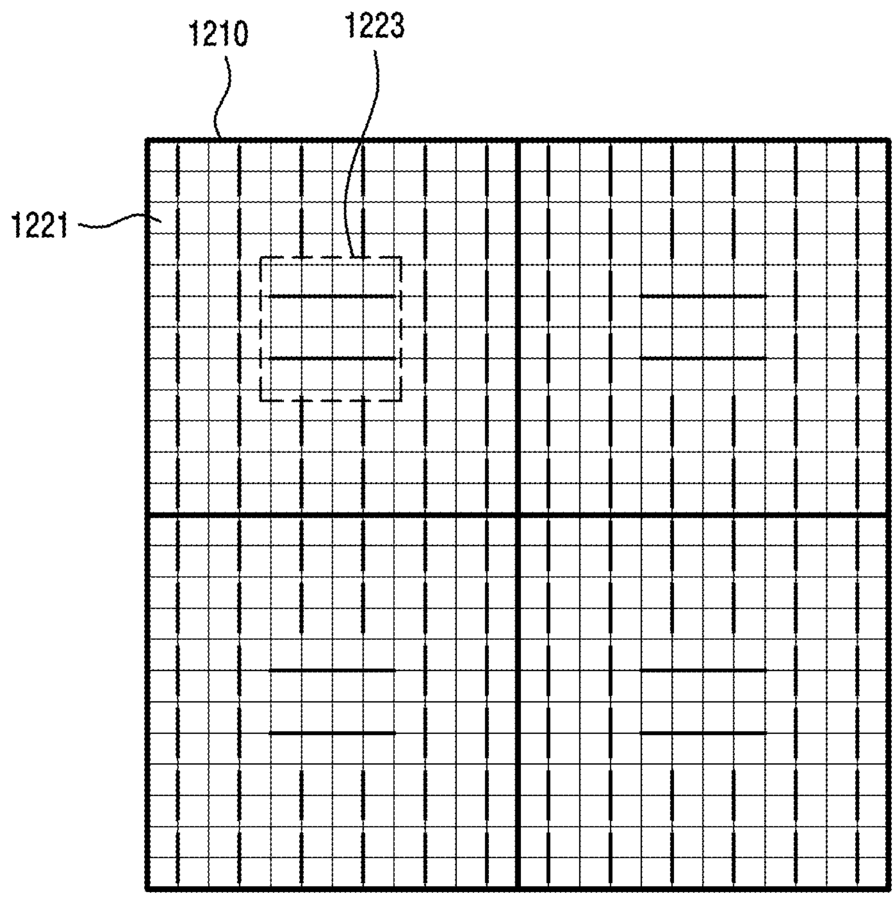
FIG. 12 illustrates an example of arrangement of a first pixel group and a second pixel group in an image sensor according to an embodiment of the disclosure.

FIG. 12 illustrates an example of arrangement of a first pixel group and a second pixel group in an image sensor according to an embodiment of the disclosure.

In an embodiment, the second pixel group may be disposed in a central part of the unit region.

Referring to FIG. 12, unit pixels (e.g., the second unit pixel 502 of FIG. 5) of the second pixel group may be disposed in a central region (i.e., a second pixel group 1223) of a unit region 1210. Unit pixels (e.g., the first unit pixel 501 of FIG. 5) of the first pixel group may be disposed in other region (i.e., a first pixel group 1221) within the unit region 1210. By placing the second pixel group in the center region (i.e., the second pixel group 1223) of the unit region 1210, an offset between the phase of the first pixel group 1221 and the phase of the second pixel group 1223 may be cancelled.

Figure 13:
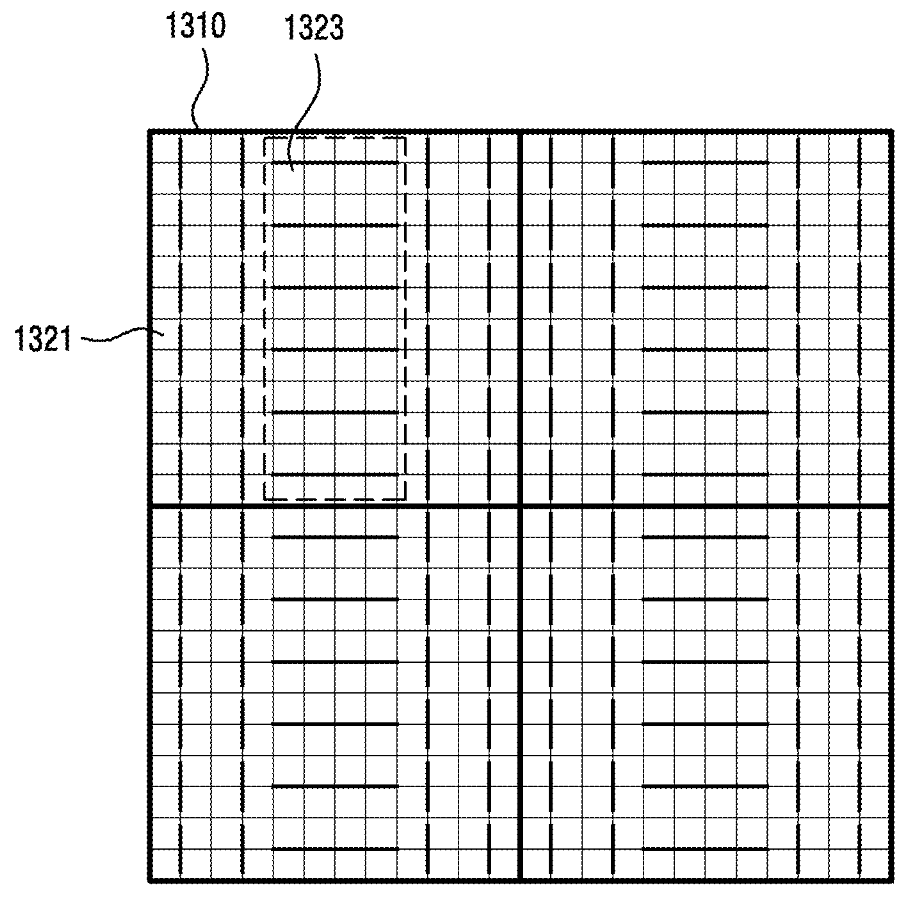
FIG. 13 illustrates an example of arrangement of a first pixel group and a second pixel group in an image sensor according to an embodiment of the disclosure.

FIG. 13 illustrates an example of arrangement of a first pixel group and a second pixel group in an image sensor according to an embodiment of the disclosure.

According to an embodiment, the image sensor (e.g., the image sensor 230 of FIGS. 2 through 4) may have a structure in which unit pixels disposed in the same row or column are connected with the same signal lines (e.g., the signal lines SL1, SL2, SL3, and SL4 of FIG. 5) due to a reason in a process for manufacturing the image sensor (e.g., the image sensor 230 of FIGS. 2 through 4) or due to a structural reason of the layout configuring the image sensor (e.g., the image sensor 230 of FIGS. 2 through 4). Unit pixels (e.g., the first unit pixel 501 of FIG. 5) belonging to the first pixel group may be disposed in a row or a column of some unit pixels of the unit pixels included in the image sensor within the unit region. Unit pixels (e.g., the second unit pixel 502 of FIG. 5) belonging to the second pixel group may be disposed in rows or columns of other unit pixels within the unit region.

Referring to FIG. 13, unit pixels disposed in a first column 1321 within a unit region 1310 of the image sensor according to an embodiment may include unit pixels of the first pixel group. Unit pixels disposed in a second column 1323 within the unit region 1310 of the image sensor according to an embodiment may include unit pixels of the second pixel group.

Figure 14:
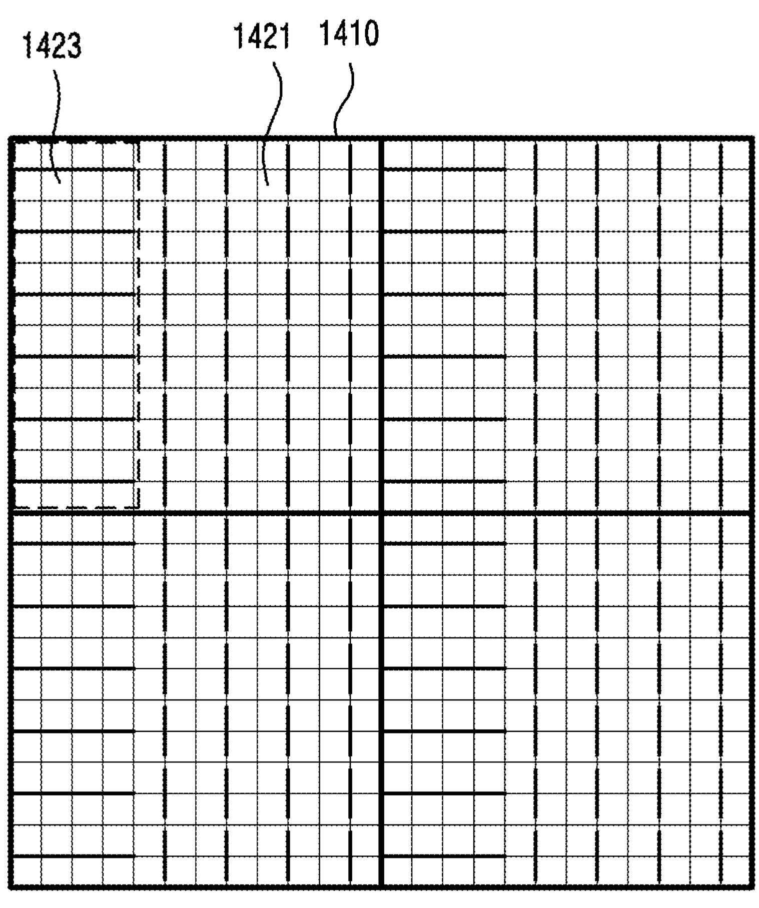
FIG. 14 illustrates an example of arrangement of a first pixel group and a second pixel group in an image sensor according to an embodiment of the disclosure.

FIG. 14 illustrates an example of arrangement of a first pixel group and a second pixel group in an image sensor according to an embodiment of the disclosure.

In an embodiment, positions at which the first pixel group and the second pixel group are disposed may vary.

Referring to FIG. 14, unit pixels (e.g., the first unit pixel 501 of FIG. 5) belonging to the first pixel group may be disposed in a right region 1421 of a unit region 1410. Unit pixels (e.g., the second unit pixel 502 of FIG. 5) belonging to the second pixel group may be disposed in a left region 1423 of the unit region 1410.

In an embodiment, a size of the region in which the first pixel group is disposed and a size of the region in which the second pixel group is disposed may be different from each other. For example, the number of the unit pixels in the first pixel group may be greater than the number of the unit pixels in the second pixel group. The image sensor (e.g., the image sensor 230 of FIGS. 2 through 4) according to an embodiment may be configured to obtain phase difference data of a high-importance direction of the first direction and the second direction from more unit pixels than the phase difference data of the other direction. For example, the image sensor may be configured such that the number of unit pixels (e.g., the first unit pixel 501 of FIG. 5) operating to obtain the phase difference data of the horizontal direction is greater than the number of unit pixels (e.g., the second unit pixel 502 of FIG. 5) operating to obtain the phase difference data of the vertical direction.

Figure 15:
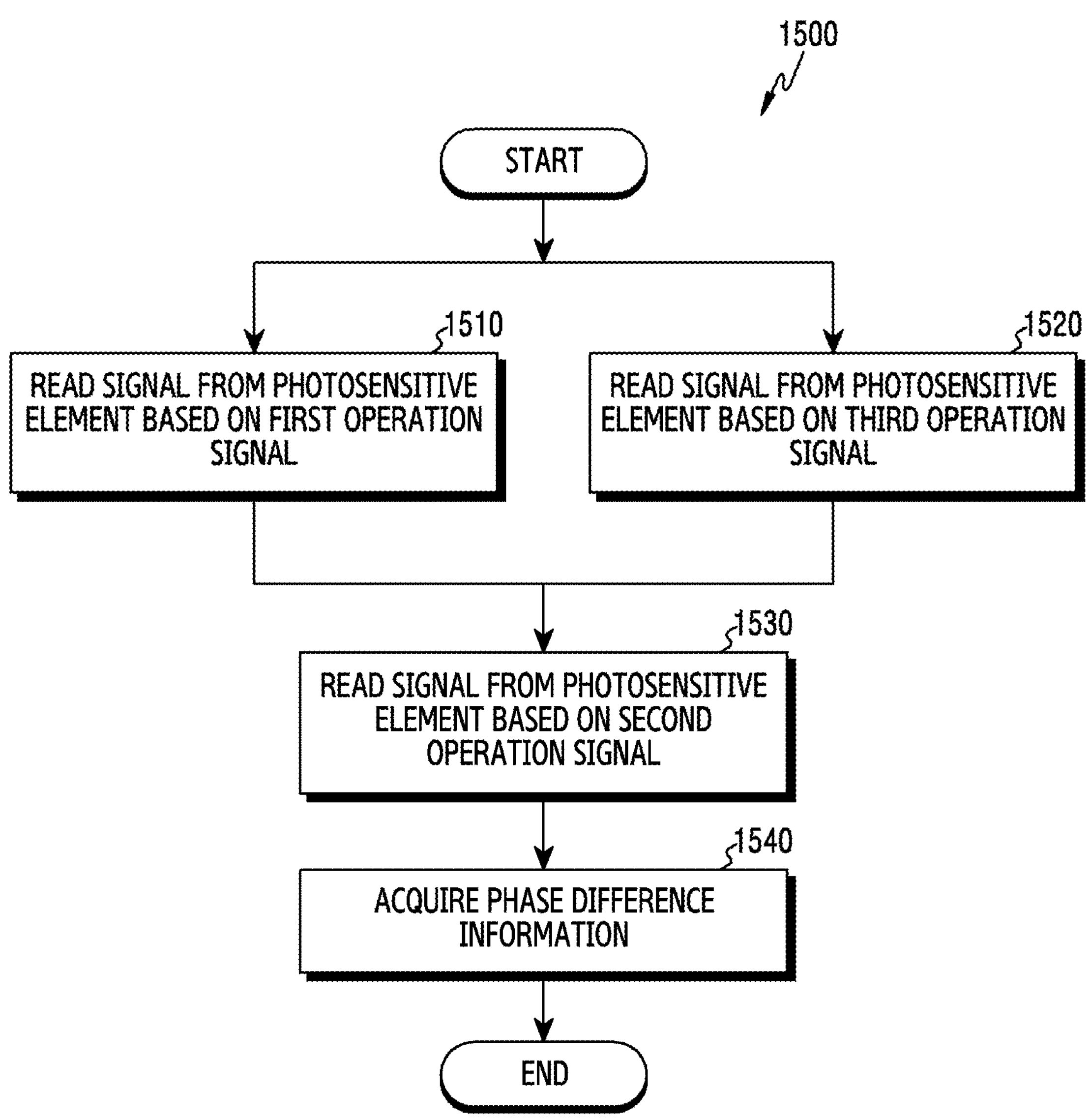
FIG. 15 is a flowchart illustrating a process for an electronic device to obtain phase difference information according to an embodiment of the disclosure.

FIG. 15 is a flowchart 1500 illustrating a process for an electronic device (e.g., the electronic device 101 of FIG. 1) to obtain phase difference information according to an embodiment of the disclosure.

In the disclosure, it may be understood that operations of the electronic device are carried out in a manner that a processor (e.g., the processor 120 of FIG. 1) performs computation by executing instructions stored in memory (e.g., the memory 130 of FIG. 1) or controls components of the electronic device.

Referring to FIG. 15, in operation 1510, the electronic device may read out a signal from a photosensitive element (e.g., the first photosensitive element 521 of the first unit pixel 501, the fourth photosensitive element 524 of the second unit pixel 502 of FIG. 5) of the image sensor based on the first operation signal (e.g., the signal fed through the first signal line SL1 of FIG. 5). According to an embodiment, in operation 1520 in parallel with operation 1510, the electronic device may read out a signal from a photosensitive element (e.g., the third photosensitive element 523 of the first unit pixel 501, the fifth photosensitive element 525 of the second unit pixel 502 of FIG. 5) based on the third operation signal (e.g., the signal fed through the third signal line SL3 of FIG. 5). The electronic device may read a sum value of the signals of the individual pixel read based on the first operation signal and the individual pixel read based on the third operation signal. For example, referring to FIG. 5, the electronic device may perform the ADC on the signals read out in operation 1510 and operation 1520 to obtain a left pixel value (LY) from the first unit pixel 501 and a top pixel value (TY) from the second unit pixel 502.

According to an embodiment, in operation 1530, the electronic device may read out a signal from a photosensitive element (e.g., the second photosensitive element 522 of the first unit pixel 501, the sixth photosensitive element 526 of the second unit pixel 502 of FIG. 5) of the image sensor based on the second operation signal (e.g., the signal fed through the second signal line SL2 of FIG. 5). In an embodiment, if the unit pixel includes four individual pixels (photosensitive elements) disposed in a 2×2 arrangement, the electronic device may further perform reading out a signal from a photosensitive element (e.g., the seventh photosensitive element 527 of the first unit pixel 501, the eighth photosensitive element 528 of the second unit pixel 502 of FIG. 5) of the image sensor based on the fourth operation signal (e.g., the signal fed through the fourth signal line SL4 of FIG. 5) with operation 1530. The electronic device may read a sum value of the signals of the individual pixel read based on the second operation signal and the individual pixel read based on the fourth operation signal in operation 1530. For example, referring to FIG. 5, the electronic device may perform the ADC on the signals read in operation 1530, to thus obtain a right pixel value (RY) from the first unit pixel 501 and a bottom pixel value (BY) from the second unit pixel 502.

According to an embodiment, in operation 1540, the electronic device may obtain phase difference information from the obtained information. The obtained information may include, for example, information obtained by performing operation 1510, operation 1520 and operation 1530. The obtained information may include, for example, at least one of the left pixel value (LY), the top pixel value (TY), the right pixel value (RY) or the bottom pixel value (BY). For example, the electronic device may perform a correlation operation based on the obtained information to acquire first phase difference data for the first direction and second phase difference data for the second direction.

Figure 16:
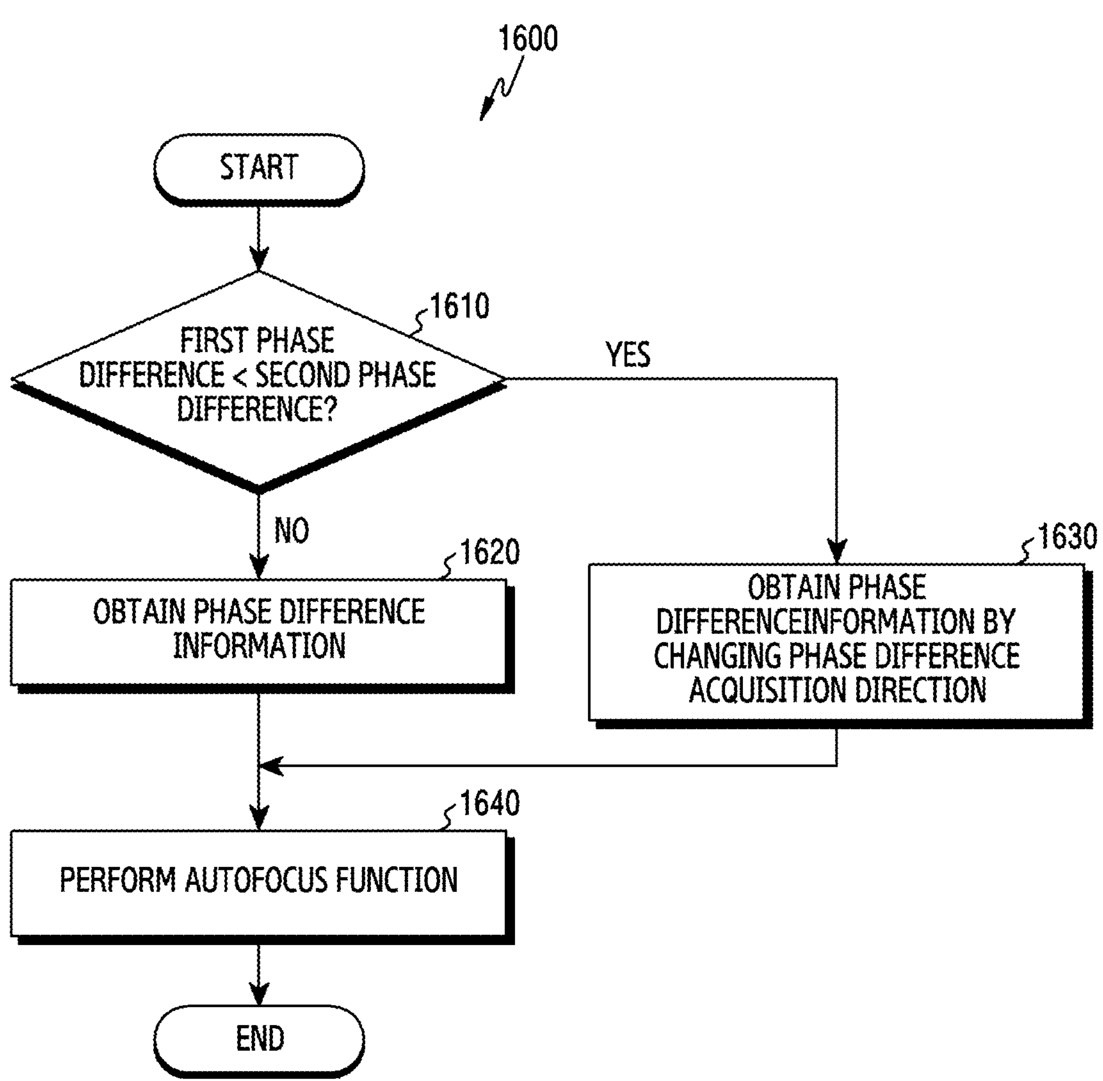
FIG. 16 is a flowchart illustrating a process in which an electronic device acquires phase difference information by changing a phase difference acquisition direction based on a designated condition according to an embodiment of the disclosure.

FIG. 16 is a flowchart illustrating a process in which an electronic device (e.g., the electronic device 101 of FIG. 1) acquires phase difference information by changing a phase difference acquisition direction based on a designated condition according to an embodiment of the disclosure.

Referring to FIG. 16, in a method 1600, in operation 1610, the electronic device may determine whether the designated condition is satisfied. For example, the electronic device may compare reliability (or importance) of the first phase difference information and the reliability (or importance) of the second phase difference information. The first phase difference information may include phase difference information of the first direction. The second phase difference information may include phase difference information of the second direction which is different from the first direction. For example, the electronic device may determine a reliability (or importance) value for at least one of the left pixel value (LY), the top pixel value (TY), the right pixel value (RY) or the bottom pixel value (BY) with respect to a region of interest. The region of interest may indicate a region for focusing by performing the autofocus (AF). In an embodiment, the electronic device may determine high-importance information from the first phase difference information and the second phase difference information based on a posture of the electronic device. For example, the electronic device may determine the phase difference information of the high-importance direction based on whether the first direction (e.g., the x-axis direction) or the second direction (e.g., the y-axis direction) of the image sensor 230 of FIG. 4 is disposed horizontally or vertically with respect to a ground. The electronic device may obtain posture information by using a sensor (e.g., a gyro sensor, an accelerometer) for detecting the posture of the electronic device.

In another embodiment, if the reliability (or importance) value for the first phase difference information is greater than or equal to the reliability (or importance) value for the second phase difference information, the electronic device may perform operation 1620 to obtain the phase difference information. For example, referring to FIG. 5, the first operation signal SL1 and the third operation signal SL3 are transmitted together to read out the left pixel value LY from the first unit pixel 501 and the top pixel value TY from the second unit pixel 502. For example, the second operation signal SL2 and the fourth operation signal SL4 are transmitted together to read out the right pixel value RY from the first unit pixel 501 and the bottom pixel value BT from the second unit pixel 502. For example, the electronic device performs acquiring the phase difference information based on the timeline shown in FIG. 7. In operation 1620, the number of the unit pixels for reading the signal to obtain the first phase difference information may be greater than the number of the unit pixels for reading the signal to obtain the second phase difference information in the image sensor (e.g., the image sensor 230 of FIGS. 2 through 4) of the electronic device.

In an embodiment, if the reliability (or importance) value for the second phase difference information is greater than the reliability (or importance) value for the first phase difference information, the electronic device may perform operation 1630 to acquire the phase difference information by changing the phase difference acquisition direction. For example, referring to FIG. 5, the first operation signal SL1 and the second operation signal SL2 may be transmitted together to read out the top pixel value TY from the first unit pixel 501 and the left pixel value LY from the second unit pixel 502. For example, the third operation signal SL3 and the fourth operation signal SL4 may be transmitted together to read out the bottom pixel value BY from the first unit pixel 501 and the right pixel value RY from the second unit pixel 502. In operation 1630, the number of the unit pixels for reading the signal to obtain the second phase difference information may be greater than the number of the unit pixels for reading the signal to obtain the first phase difference information in the image sensor of the electronic device.

In an embodiment, if a camera of the electronic device rotates 90 degrees on the facing direction to capture a scene, operation 1630 of changing the phase difference acquisition direction may be performed.

In operation 1640, the electronic device according to an embodiment may perform the AF function based on at least one of the first phase difference information or the second phase difference information obtained by performing operation 1620 or operation 1630. For example, the electronic device controls an operation of an AF actuator to perform the AF function of the electronic device based on the phase difference information.

Figure 17:
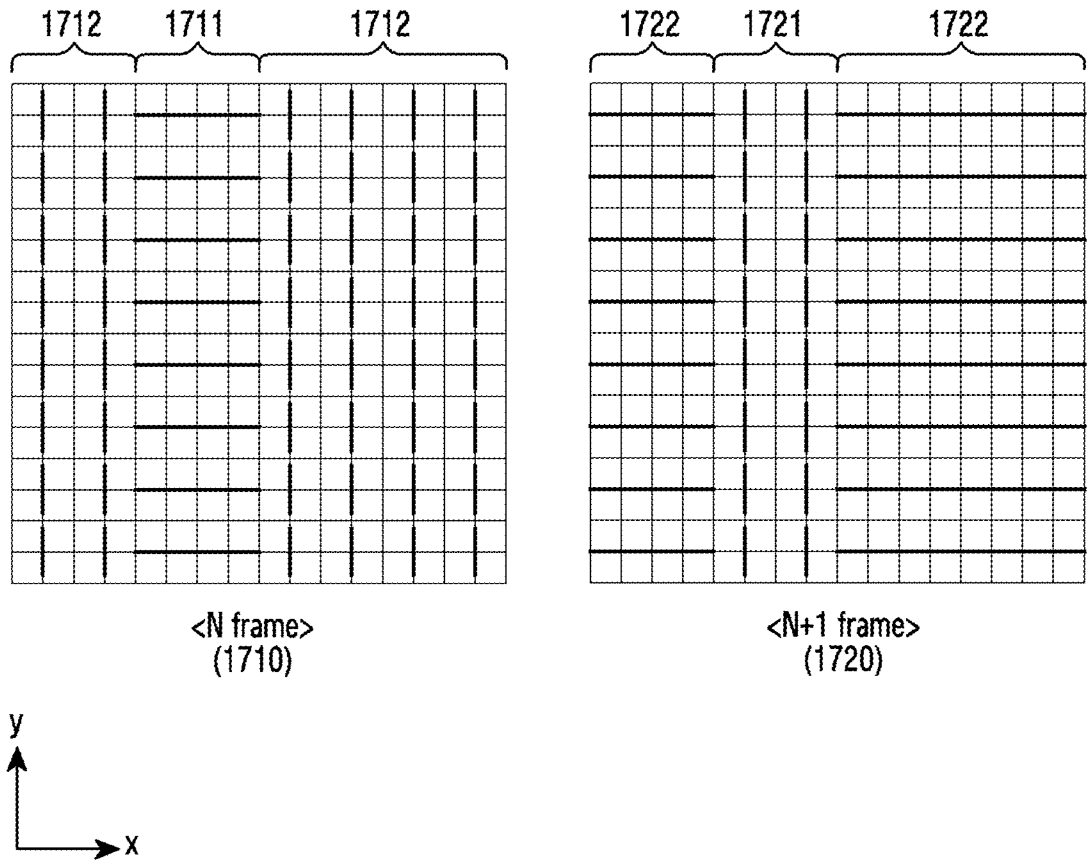
FIG. 17 is a diagram illustrating a direction of phase difference information contained in a frame before an electronic device changes a phase difference acquisition direction and a frame after the change according to an embodiment of the disclosure.

FIG. 17 is a diagram illustrating a direction of phase difference information contained in a first frame before an electronic device changes a phase difference acquisition direction and a second frame after the change according to an embodiment of the disclosure.

FIG. 17 may be understood as illustrating a unit region configuring an AF frame unit obtained to perform the AF function within an image sensor.

Referring to FIG. 17, the electronic device may obtain phase difference data for the vertical direction (the y-axis direction) from unit pixels disposed in a first region 1711 with respect to the first frame 1710. The electronic device may obtain phase difference data for the horizontal direction (the x-axis direction) from unit pixels disposed in a second region 1712 other than the first region 1711.

In an embodiment, the electronic device may analyze the phase difference data for the first frame 1710. If determining that importance of the phase difference information for the vertical direction on focal length detection (or reliability of the phase difference in the vertical direction) is greater than importance of the phase difference information for the horizontal direction (or reliability of the phase difference in the horizontal direction), the electronic device may change the direction in which the unit pixels of the image sensor obtain the phase difference information. Referring to FIG. 17, the electronic device may obtain phase difference data for the horizontal direction (the x-axis direction) from the unit pixels disposed in the first region 1721 with respect to the second frame 1720. The electronic device may obtain phase difference data for the vertical direction (the y-axis direction) from the unit pixels disposed in the second region 1722.

In an embodiment, if the camera of the electronic device rotates 90 degrees on the facing direction to capture a scene, the phase difference acquisition direction may change.

Figure 18:
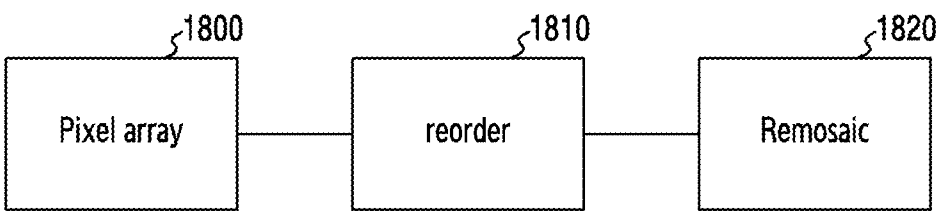
FIG. 18 is a block diagram illustrating a structure for outputting information from an image sensor according to an embodiment of the disclosure.

FIG. 18 is a block diagram illustrating a structure for outputting information from an image sensor according to an embodiment of the disclosure.

Referring to FIG. 18, a camera module (e.g., the camera module 180 of FIGS. 1 and 2) of an electronic device (e.g., the electronic device 101 of FIG. 1) including the image sensor may include a pixel array 1800, a reorder 1810, and a remosaic operator 1820.

In an embodiment, the pixel array 1800 may include an array of pixels included in the image sensor (e.g., the image sensor 230 of FIGS. 2 through 4). If performing the remosaic operation 1820 on information obtained from the image sensor, information read from the pixel array 1800 may be forwarded to the reorder 1810.

In an embodiment, at least one of the reorder 1810 or the remosaic operator 1820 may be configured as at least a part of an image signal processor (e.g., the image signal processor 260 of FIG. 2) or a processor (e.g., the processor 120 of FIG. 1), but is not limited thereto. For example, at least one of the reorder 1810 or the remosaic operator 1820 may be configured as a part (e.g., the computation unit 317 of FIG. 3) of the image sensor. At least one of the reorder 1810 or the remosaic operator 1820 may be configured to include memory for recording a program executed by the processor or a computation circuit.

In an embodiment, the electronic device may perform a reorder operation on data outputted from the pixel array 1800 before the electronic device performs the remosaic operation. The remosaic operation may indicate converting image data not in a designated pattern (e.g., a bayer pattern) into a designated pattern. The reorder 1810 may change arrangement of at least a part of pixel values outputted from the pixel array 1800 in an image frame. For example, the reorder 1810 may be configured to reorder a pixel value read out based on the second operation signal (e.g., the pixel value outputted from the sixth photosensitive element 526) and a pixel value read out based on the third operation signal (e.g., the pixel value outputted from the fifth photosensitive element 525) in the unit pixel (e.g., the second unit pixel 502 of FIG. 5) of the second pixel group. The remosaic operator 1820 may perform the remosaic operation on the reordered pixel values.

According to an embodiment, an electronic device and its operating method may be provided to prevent frame rate reduction of an image sensor and to provide phase difference information of two or more directions.

It is possible to compare a first case which provides phase difference information in only one direction, a second case which provides phase difference information in two directions through two ADC operations, and a case of the electronic device according to an embodiment.

In the first case, the image sensor may provide only the phase difference information of the horizontal direction (H). The second case may provide the phase difference information of the horizontal direction (H) and the phase difference information of the vertical direction (V). However, the second case needs to perform the ADC operation for acquiring the phase difference information of the horizontal direction (H) and the ADC operation for acquiring the phase difference information of the vertical direction (V) and accordingly the frame rate is reduced compared to the first case. The electronic device and its operation method according to an embodiment may provide the phase difference information of the horizontal direction (H) acquired from some pixels of the entire pixels of the image sensor, and the phase difference information of the vertical direction (V) acquired from the remaining pixels, and allow the image sensor to support the same frame rate as in the first case. Thus, the electronic device and its operating method according to an embodiment may allow the AF operation with higher accuracy than the first case. The electronic device and its operating method according to an embodiment may reduce or prevent the frame rate reduction from the frame rate of the first case compared to the second case.

In an embodiment, an electronic device (e.g., the electronic device 101 of FIG. 1) may include a camera module (e.g., the camera module 180 of FIGS. 1 and 2), at least one processor (e.g., the processor 120 of FIG. 1), and a memory (e.g., the memory 130 of FIG. 1). The camera module (e.g., the camera module 180 of FIGS. 1 and 2) may include at least one lens (e.g., the lens assembly 210 of FIG. 2) and an image sensor (e.g., the image sensor 230 of FIGS. 2 through 4) configured to output a signal by detecting light received through the at least one lens (e.g., the lens assembly 210 of FIG. 2). The memory (e.g., the memory 130 of FIG. 1) may storing one or more instructions executed by the at least one processor (e.g., the processor 120 of FIG. 1) to operate the electronic device (e.g., the electronic device 101 of FIG. 1). The image sensor (e.g., the image sensor 230 of FIGS. 2 through 4) may include a first pixel group including a first micro lens (e.g., the first micro lens 511 of FIG. 5) and a second pixel group including a second micro lens (e.g., the second micro lens 512 of FIG. 5). The first pixel group may include a first unit pixel (e.g., the first unit pixel 501 of FIG. 5) including a first photosensitive element (e.g., the first photosensitive element 521 of FIG. 5), a second photosensitive element (e.g., the second photosensitive element 522 of FIG. 5) and a third photosensitive element (e.g., the third photosensitive element 523 of FIG. 5). The first photosensitive element (e.g., the first photosensitive element 521 of FIG. 5) may be disposed to receive at least a part of light passing through the first micro lens (e.g., the first micro lens 511 of FIG. 5). The second photosensitive element (e.g., the second photosensitive element 522 of FIG. 5) may be disposed in a first direction (e.g., an x-axis direction) with respect to the first photosensitive element (e.g., the first photosensitive element 521 of FIG. 5). The third photosensitive element (e.g., the third photosensitive element 523 of FIG. 5) may be disposed in a second direction (e.g., a y-axis direction) different from the first direction with respect to the first photosensitive element (e.g., the first photosensitive element 521 of FIG. 5). The second pixel group may include a second unit pixel (e.g., the second unit pixel 502 of FIG. 5) including a fourth photosensitive element (e.g., the fourth photosensitive element 524 of FIG. 5), a fifth photosensitive element (e.g., the fifth photosensitive element 525 of FIG. 5) and a sixth photosensitive element (e.g., the sixth photosensitive element 526 of FIG. 5). The fourth photosensitive element (e.g., the fourth photosensitive element 524 of FIG. 5) may be disposed to receive at least a part of light passing through the second micro lens (e.g., the second micro lens 512 of FIG. 5). The fifth photosensitive element (e.g., the fifth photosensitive element 525 of FIG. 5) may be disposed in the first direction with respect to the fourth photosensitive element (e.g., the fourth photosensitive element 524 of FIG. 5). The sixth photosensitive element (e.g., the sixth photosensitive element 526 of FIG. 5) may be disposed in the second direction with respect to the fourth photosensitive element (e.g., the fourth photosensitive element 524 of FIG. 5). The one or more instructions may be executed by the at least one processor (e.g., the processor 120 of FIG. 1) to cause the electronic device (e.g., the electronic device 101 of FIG. 1) to control the image sensor 230 to read out a signal from the first photosensitive element (e.g., the first photosensitive element 521 of FIG. 5) and the fourth photosensitive element (e.g., the fourth photosensitive element 524 of FIG. 5) based on a first operation signal. The one or more instructions may be executed by the at least one processor (e.g., the processor 120 of FIG. 1) to cause the electronic device (e.g., the electronic device 101 of FIG. 1) to control the image sensor to read out a signal from the second photosensitive element (e.g., the second photosensitive element 522 of FIG. 5) and the sixth photosensitive element (e.g., the sixth photosensitive element 526 of FIG. 5) based on a second operation signal. The one or more instructions may be executed by the at least one processor (e.g., the processor 120 of FIG. 1) to cause the electronic device (e.g., the electronic device 101 of FIG. 1) to control the image sensor to read out a signal from the third photosensitive element (e.g., the third photosensitive element 523 of FIG. 5) and the fifth photosensitive element (e.g., the fifth photosensitive element 525 of FIG. 5) based on a third operation signal.

In an embodiment, the first unit pixel (e.g., the first unit pixel 501 of FIG. 5) may include a first floating diffusion node (e.g., the first floating diffusion node 611 of FIG. 1), a first switch (e.g., the first switch 621 of FIG. 6), a second switch (e.g., the second switch 622 of FIG. 6) and a third switch (e.g., the third switch 62. of FIG. 6). The first switch (e.g., the first switch 621 of FIG. 6) may be connected between the first photosensitive element (e.g., the first photosensitive element 521 of FIG. 5) and the first floating diffusion node (e.g., the first floating diffusion node 611 of FIG. 1). The second switch (e.g., the second switch 622 of FIG. 6) may be connected between the second photosensitive element (e.g., the second photosensitive element 522 of FIG. 5) and the first floating diffusion node (e.g., the first floating diffusion node 611 of FIG. 1). The third switch (e.g., the third switch 623 of FIG. 6) may be connected between the third photosensitive element (e.g., the third photosensitive element 523 of FIG. 5) and the first floating diffusion node (e.g., the first floating diffusion node 611 of FIG. 1). The second unit pixel (e.g., the second unit pixel 502 of FIG. 5) may include a second floating diffusion node (e.g., the second floating diffusion node 612 of FIG. 1), a fourth switch (e.g., the fourth switch 624 of FIG. 6), a fifth switch (e.g., the fifth switch 625 of FIG. 6) and a sixth switch (e.g., the sixth switch 626 of FIG. 6). The fourth switch (e.g., the fourth switch 624 of FIG. 6) may be connected between the fourth photosensitive element (e.g., the fourth photosensitive element 524 of FIG. 5) and the second floating diffusion node (e.g., the second floating diffusion node 612 of FIG. 1). The fifth switch (e.g., the fifth switch 625 of FIG. 6) may be connected between the fifth photosensitive element (e.g., the fifth photosensitive element 525 of FIG. 5) and the second floating diffusion node (e.g., the second floating diffusion node 612 of FIG. 1). The sixth switch (e.g., the sixth switch 626 of FIG. 6) may be connected between the sixth photosensitive element (e.g., the sixth photosensitive element 526 of FIG. 5) and the second floating diffusion node (e.g., the second floating diffusion node 612 of FIG. 1). The image sensor (e.g., the image sensor 230 of FIGS. 2 through 4) may include a first signal line (e.g., the first signal line SL1 of FIG. 5), a second signal line (e.g., the second signal line SL2 of FIG. 5) and a third signal line (e.g., the third signal line SL3 of FIG. 5). The first signal line (e.g., the first signal line SL1 of FIG. 5) may be connected to the first switch (e.g., the first switch 621 of FIG. 6) and the fourth switch (e.g., the fourth switch 624 of FIG. 6). The second signal line (e.g., the second signal line SL2 of FIG. 5) may be connected to the second switch (e.g., the second switch 622 of FIG. 6) and the sixth switch (e.g., the sixth switch 626 of FIG. 6). The third signal line (e.g., the third signal line SL3 of FIG. 5) may be connected to the third switch (e.g., the third switch 623 of FIG. 6) and the fifth switch (e.g., the fifth switch 625 of FIG. 6).

In an embodiment, the first direction and the second direction may be orthogonal to each other. The image sensor (e.g., the image sensor 230 of FIGS. 2 through 4) may be configured to obtain first phase difference data for a phase difference between pixels disposed in the second direction from the first pixel group. The image sensor (e.g., the image sensor 230 of FIGS. 2 through 4) may be configured to obtain second phase difference data for a phase difference between pixels disposed in the first direction from the second pixel group.

In an embodiment, the number of unit pixels of the first pixel group may be greater than the number of unit pixels of the second pixel group in a unit region included in the image sensor (e.g., the image sensor 230 of FIGS. 2 through 4).

In an embodiment, the first unit pixel (e.g., the first unit pixel 501 of FIG. 5) may include a plurality of photosensitive elements arranged in an N×N array, including the first photosensitive element (e.g., the first photosensitive element 521 of FIG. 5), the second photosensitive element (e.g., the second photosensitive element 52 of FIG. 5) and the third photosensitive element (e.g., the third photosensitive element 523 of FIG. 5). The second unit pixel (e.g., the second unit pixel 502 of FIG. 5) may include a plurality of photosensitive elements including the fourth photosensitive element (e.g., the fourth photosensitive element 524 of FIG. 5), the fifth photosensitive element (e.g., the fifth photosensitive element 525 of FIG. 5), and the sixth photosensitive element (e.g., the sixth photosensitive element 526 of FIG. 5) and arranged in an N×N array. N may have a value greater than or equal to 2.

In an embodiment, the at least one processor (e.g., the processor 120 of FIG. 1) may be configured to determine whether a designated condition is satisfied. The at least one processor (e.g., the processor 120 of FIG. 1) may be configured to read out a signal by transmitting the first operation signal and the third operation signal together based on determining that the designated condition is not satisfied. The at least one processor (e.g., the processor 120 of FIG. 1) may be configured to read out a signal by transmitting the first operation signal and the second operation signal together based on determining that the designated condition is satisfied.

In an embodiment, the designated condition may be that reliability of the phase difference of the second direction is higher than reliability of the phase difference of the first direction.

In an embodiment, the image sensor (e.g., the image sensor 230 of FIGS. 2 through 4) or the at least one processor (e.g., the processor 120 of FIG. 1) may be configured to rearrange information outputted from the fifth photosensitive element (e.g., the fifth photosensitive element 525 of FIG. 5) and information outputted from the sixth photosensitive element (e.g., the sixth photosensitive element 526 of FIG. 5) included in the second pixel group within an image frame outputted from the image sensor (e.g., the image sensor 230 of FIGS. 2 through 4).

In an embodiment, the first pixel group (e.g., the pixels of the first region 1121 of FIG. 11) and the second pixel group (e.g., the pixels of the second region 1123 of FIG. 11) may be included in a first unit region (e.g., the first unit region 1111 of FIG. 11) of the image sensor (e.g., the image sensor 230 of FIGS. 2 through 4). The image sensor (e.g., the image sensor 230 of FIGS. 2 through 4) may include a third pixel group and a fourth pixel group (e.g., the pixels of the third region 1124 of FIG. 11). The third pixel group may include photosensitive elements configured to read phase difference information of a direction corresponding to phase difference information read from the photosensitive elements of the first pixel group (e.g., the first unit region 1111 of FIG. 11). The fourth pixel group (e.g., the pixels of the third region 1124 of FIG. 11) may include photosensitive elements configured to read phase difference information of a direction corresponding to phase difference information read from the photosensitive elements of the second pixel group (e.g., the pixels of the second region 1123 of FIG. 11). A position at which the fourth pixel group (e.g., the pixels of the third region 1124 of FIG. 11) is disposed within the second unit region (e.g., the second unit region 1112 of FIG. 11) may be at least in part different from a position at which the second pixel group (e.g., the pixels of the second region 1123 of FIG. 11) is disposed within the first unit region (e.g., the first unit region 1111 of FIG. 11).

In an embodiment, the at least one processor (e.g., the processor 120 of FIG. 1) may be configured to acquire first phase difference data by summing a signal read based on the first operation signal and a signal read based on the second operation signal from the image sensor (e.g., the image sensor 230 of FIGS. 2 through 4).

In an embodiment, an operating method of an electronic device (e.g., the electronic device 101 of FIG. 1) including an image sensor (e.g., the image sensor 230 of FIGS. 2 through 4) which includes a first pixel group including a first photosensitive element (e.g., the first photosensitive element 521 of FIG. 5), a second photosensitive element (e.g., the second photosensitive element 522 of FIG. 5) and a third photosensitive element (e.g., the third photosensitive element 523 of FIG. 5), and a second pixel group including a fourth photosensitive element (e.g., the fourth photosensitive element 524 of FIG. 5), a fifth photosensitive element (e.g., the fifth photosensitive element 525 of FIG. 5) and a sixth photosensitive element (e.g., the sixth photosensitive element 526 of FIG. 5), may include reading a signal from the first photosensitive element (e.g., the first photosensitive element 521 of FIG. 5) and the fourth photosensitive element (e.g., the fourth photosensitive element 524 of FIG. 5) based on a first operation signal. The operating method of the electronic device (e.g., the electronic device 101 of FIG. 1) may include reading a signal from the second photosensitive element (e.g., the second photosensitive element 522 of FIG. 5) and the sixth photosensitive element (e.g., the sixth photosensitive element 526 of FIG. 5) based on a second operation signal. The operating method of the electronic device (e.g., the electronic device 101 of FIG. 1) may include reading a signal from the third photosensitive element (e.g., the third photosensitive element 523 of FIG. 5) and the fifth photosensitive element (e.g., the fifth photosensitive element 525 of FIG. 5) based on a third operation signal. The first photosensitive element (e.g., the first photosensitive element 521 of FIG. 5) may be disposed to receive at least a part of light passing through a first micro lens (e.g., the first micro lens 511 of FIG. 5). The second photosensitive element (e.g., the second photosensitive element 522 of FIG. 5) may be disposed in a first direction with respect to the first photosensitive element (e.g., the first photosensitive element 521 of FIG. 5). The third photosensitive element (e.g., the third photosensitive element 523 of FIG. 5) may be disposed in a second direction different from the first direction with respect to the first photosensitive element (e.g., the first photosensitive element 521 of FIG. 5). The fourth photosensitive element (e.g., the fourth photosensitive element 524 of FIG. 5) may be disposed to receive at least a part of light passing through a second micro lens (e.g., the second micro lens 512 of FIG. 5). The fifth photosensitive element (e.g., the fifth photosensitive element 525 of FIG. 5) may be disposed in the first direction with respect to the fourth photosensitive element (e.g., the fourth photosensitive element 524 of FIG. 5). The sixth photosensitive element (e.g., the sixth photosensitive element 526 of FIG. 5) may be disposed in the second direction with respect to the fourth photosensitive element (e.g., the fourth photosensitive element 524 of FIG. 5).

In an embodiment, the first direction and the second direction may be orthogonal to each other. The method may further include obtaining first phase difference data for a phase difference between pixels disposed in the second direction from the first pixel group. The operation may further include obtaining second phase difference data for a phase difference between pixels disposed in the first direction from the second pixel group.

The method may further include determining whether a designated condition is satisfied. The method may further include transmitting the first operation signal and the third operation signal together based on determining that the designated condition is not satisfied. The method may further include transmitting the first operation signal and the second operation signal together based on determining that the designated condition is not satisfied.

In an embodiment, the designated condition may be that reliability of the phase difference of the second direction is higher than reliability of the phase difference of the first direction.

In an embodiment, the method may further include rearranging information outputted from the fifth photosensitive element (e.g., the fifth photosensitive element 525 of FIG. 5) and information outputted from the sixth photosensitive element (e.g., the sixth photosensitive element 526 of FIG. 5) in an image frame outputted from the image sensor (e.g., the image sensor 230 of FIGS. 2 through 4).

In an embodiment, an image sensor (e.g., the image sensor 230 of FIGS. 2 through 4) may include a first pixel group and a second pixel group. The first pixel group may include a first unit pixel (e.g., the first unit pixel 501 of FIG. 5) including a first individual pixel, a second individual pixel and a third individual pixel corresponding to a first micro lens (e.g., the first micro lens 511 of FIG. 5). The second individual pixel may be disposed in a first direction with respect to the first individual pixel. The third individual pixel may be disposed in a second direction different from the first direction with respect to the first individual pixel. The second pixel group may include a second unit pixel (e.g., the second unit pixel 502 of FIG. 5) including a fourth individual pixel, a fifth individual pixel and a sixth individual pixel corresponding to a second micro lens (e.g., the second micro lens 512 of FIG. 5). The fifth individual pixel may be disposed in the first direction with respect to the fourth individual pixel. The sixth individual pixel may be disposed in the second direction with respect to the fourth individual pixel. The first individual pixel and the fourth individual pixel may be connected to a first signal line (e.g., the first signal line SL1 of FIG. 5) transmitting a first operation signal. The second individual pixel and the sixth individual pixel may be connected to a second signal line (e.g., the second signal line SL2 of FIG. 5) transmitting a second operation signal. The third individual pixel and the fifth individual pixel may be connected to a third signal line (e.g., the third signal line SL3 of FIG. 5) transmitting a third operation signal.

In an embodiment, the first individual pixel may include a first switch (e.g., the first switch 621 of FIG. 6) connected between a first photosensitive element (e.g., the first photosensitive element 521 of FIG. 5) and a first floating diffusion node (e.g., the first floating diffusion node 611 of FIG. 1) of the first unit pixel (e.g., the first unit pixel 501 of FIG. 5). The second individual pixel may include a second switch (e.g., the second switch 622 of FIG. 6) connected between a second photosensitive element (e.g., the second photosensitive element 522 of FIG. 5) and the first floating diffusion node (e.g., the first floating diffusion node 611 of FIG. 1). The third individual pixel may include a third switch (e.g., the third switch 623 of FIG. 6) connected between a third photosensitive element (e.g., the third photosensitive element 523 of FIG. 5) and the first floating diffusion node (e.g., the first floating diffusion node 611 of FIG. 1). The fourth individual pixel may include a fourth switch (e.g., the fourth switch 624 of FIG. 6) connected between a fourth photosensitive element (e.g., the fourth photosensitive element 524 of FIG. 5) and a second floating diffusion node (e.g., the second floating diffusion node 612 of FIG. 1) of the second unit pixel (e.g., the second unit pixel 502 of FIG. 5). The fifth individual pixel may include a fifth switch (e.g., the fifth switch 625 of FIG. 6) connected between a fifth photosensitive element (e.g., the fifth photosensitive element 525 of FIG. 5) and the second floating diffusion node (e.g., the second floating diffusion node 612 of FIG. 1). The sixth individual pixel may include a sixth switch (e.g., the sixth switch 626 of FIG. 6) connected between a sixth photosensitive element (e.g., the sixth photosensitive element 526 of FIG. 5) and the second floating diffusion node (e.g., the second floating diffusion node 612 of FIG. 1). The first signal line (e.g., the first signal line SL1 of FIG. 5) may be connected to the first switch (e.g., the first switch 621 of FIG. 6) and the fourth switch (e.g., the fourth switch 624 of FIG. 6). The second signal line (e.g., the second signal line SL2 of FIG. 5) may be connected to the second switch (e.g., the second switch 622 of FIG. 6) and the sixth switch (e.g., the sixth switch 626 of FIG. 6). The third signal line (e.g., the third signal line SL3 of FIG. 5) may be connected to the third switch (e.g., the third switch 623 of FIG. 6) and the fifth switch (e.g., the fifth switch 625 of FIG. 6).

In an embodiment, the first direction and the second direction may be orthogonal to each other. The image sensor (e.g., the image sensor 230 of FIGS. 2 through 4) may further include a computation unit configured to obtain first phase difference data for a phase difference between pixels disposed in the second direction from the first pixel group, and obtain second phase difference data for a phase difference between pixels disposed in the first direction from the second pixel group.

In an embodiment, the image sensor (e.g., the image sensor 230 of FIGS. 2 through 4) may be configured such that the number of unit pixels of the first pixel group is greater than the number of unit pixels of the second pixel group in a unit region of the image sensor (e.g., the image sensor 230 of FIGS. 2 through 4).

In an embodiment, the first unit pixel (e.g., the first unit pixel 501 of FIG. 5) may include a plurality of photosensitive elements arranged in an N×N array, including the first photosensitive element (e.g., the first photosensitive element 521 of FIG. 5), the second photosensitive element (e.g., the second photosensitive element 522 of FIG. 5) and the third photosensitive element (e.g., the third photosensitive element 523 of FIG. 5). The second unit pixel (e.g., the second unit pixel 502 of FIG. 5) may include a plurality of photosensitive elements including the fourth photosensitive element (e.g., the fourth photosensitive element 524 of FIG. 5), the fifth photosensitive element (e.g., the fifth photosensitive element 525 of FIG. 5) and the sixth photosensitive element (e.g., the sixth photosensitive element 526 of FIG. 5) and arranged in an N×N array. N may have a value greater than or equal to 2.

The electronic device and its operating method according to various embodiments may provide the phase difference information for two or more directions and may not reduce the frame rate or may decrease the reduction.

Effects obtainable from the disclosure are not limited to the effects mentioned above, and other effects which are not mentioned may be clearly understood by those skilled in the art of the disclosure through the following descriptions.

The embodiments presented in the disclosure are not mutually exclusive, and components of the embodiments may be configured in combination within the scope presented in this disclosure.

The methods according to the embodiments described in the claims or the specification of the disclosure may be implemented in software, hardware, or a combination of hardware and software.

In software implementation, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

In the disclosure, a function or an operation performed by the electronic device may be performed by one or more processors executing one or more instructions stored in memory. The function or the operation of the electronic device mentioned in the disclosure may be carried out by one processor executing one or more instructions, or by a combination of a plurality of processors executing one or more instructions. The processor mentioned in the disclosure may be understood as including circuitry for performing computation or controlling other component of the electronic device. For example, the one or more processors may include a central processing unit (CPU), a microprocessor unit (MPU), an application processor (AP), a communication processor (CP), a neural processing unit (NPU), a system on chip (SoC) or an integrated circuit (IC) configured to execute one or more instructions. The one or more processors may be configured to perform the operation of the electronic devices described above.

Such a program (software module, software) may be stored to random access memory, non-volatile memory including a flash memory, read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to memory combining part or all of those recording media. The memory may include one storage medium, or may include a combination of a plurality of storage media. The one or more instructions may be stored in a single storage medium, or may be distributed and stored in a plurality of storage media.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the component included in the disclosure is expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

In addition, a term such as "unit" or "module" in the disclosure may be a hardware component such as a processor or a circuit, and/or a software component executed by a hardware component such as a processor.

"unit" and "module" may be stored in an addressable storage medium and implemented by a program executable by the processor. For example, "unit" and "module" may be implemented by components such as software components, object-oriented software components, class components and task components, processes, functions, attributes, procedures, sub-routines, segments of program code, drivers, firmware, microcode, circuitry, data, databases, data structures, tables, arrays and variables.

Specific implementations described in this disclosure are merely an embodiment, and are not intended to limit the scope of the disclosure in any way. For the sake of brevity of the specification, disclosure of conventional electronic configurations, control systems, software, and other functional aspects of the systems may be omitted.

In addition, in the disclosure, "including at least one of a, b, or c" may indicate "including a alone, including b alone, including c alone, or including a combination of two or more (including a and b, including b and c, including a and c, or including all of a, b, and c).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a camera module comprising at least one lens and an image sensor configured to output a signal by detecting light received through the at least one lens;

memory storing one or more computer programs; and one or more processors communicatively coupled to camera module and the memory, wherein the image sensor comprises a first pixel group comprising a first micro lens and a second pixel group comprising a second micro lens, wherein the first pixel group comprises a first unit pixel comprising a first photosensitive element, a second photosensitive element and a third photosensitive element, wherein the first photosensitive element is disposed to receive at least a part of light passing through the first micro lens, wherein the second photosensitive element is disposed in a first direction with respect to the first photosensitive element, wherein the third photosensitive element is disposed in a second direction different from the first direction with respect to the first photosensitive element, wherein the second pixel group comprises a second unit pixel comprising a fourth photosensitive element, a fifth photosensitive element and a sixth photosensitive element, wherein the fourth photosensitive element is disposed to receive at least a part of light passing through the second micro lens, wherein the fifth photosensitive element is disposed in the first direction with respect to the fourth photosensitive element, wherein the sixth photosensitive element is disposed in the second direction with respect to the fourth photosensitive element, and wherein the one or more computer programs include computer-executable instructions that, when executed by the one or more processors individually or collectively, cause the electronic device to:

control the image sensor to read out a signal from the first photosensitive element and the fourth photosensitive element based on a first operation signal, control the image sensor to read out a signal from the second photosensitive element and the sixth photosensitive element based on a second operation signal, and control the image sensor to read out a signal from the third photosensitive element and the fifth photosensitive element based on a third operation signal.

2. The electronic device of claim 1, wherein the first unit pixel comprises:

a first floating diffusion node, a first switch connected between the first photosensitive element and the first floating diffusion node, a second switch connected between the second photosensitive element and the first floating diffusion node, and a third switch connected between the third photosensitive element and the first floating diffusion node, wherein the second unit pixel comprises:

a second floating diffusion node, a fourth switch connected between the fourth photosensitive element and the second floating diffusion node, a fifth switch connected between the fifth photosensitive element and the second floating diffusion node, and a sixth switch connected between the sixth photosensitive element and the second floating diffusion node, and wherein the image sensor comprises:

a first signal line connected to the first switch and the fourth switch, a second signal line connected to the second switch and the sixth switch, and a third signal line connected to the third switch and the fifth switch.

3. The electronic device of claim 1, wherein the first direction and the second direction are orthogonal to each other, and wherein the image sensor is configured to:

obtain first phase difference data for a phase difference between pixels disposed in the second direction from the first pixel group, and obtain second phase difference data for a phase difference between pixels disposed in the first direction from the second pixel group.

4. The electronic device of claim 1, wherein a number of unit pixels of the first pixel group is greater than a number of unit pixels of the second pixel group in a unit region of the image sensor.

5. The electronic device of claim 1, wherein the first unit pixel comprises a plurality of photosensitive elements comprising the first photosensitive element, the second photosensitive element and the third photosensitive element and arranged in an N×N array, wherein the second unit pixel comprises a plurality of photosensitive elements comprising the fourth photosensitive element, the fifth photosensitive element, and the sixth photosensitive element and arranged in an N×N array, and wherein N is greater than or equal to 2.

6. The electronic device of claim 1, wherein the one or more computer programs further include computer-executable instructions that, when executed by the one or more processors individually or collectively, cause the electronic device to:

determine whether a designated condition is satisfied, read out a signal by transmitting the first operation signal and the third operation signal together based on determining that the designated condition is not satisfied, and read out a signal by transmitting the first operation signal and the second operation signal together based on determining that the designated condition is satisfied.

7. The electronic device of claim 6, wherein the designated condition is that reliability of a phase difference of the second direction is higher than reliability of a phase difference of the first direction.

8. The electronic device of claim 1, wherein the image sensor is configured to rearrange information outputted from the fifth photosensitive element and information outputted from the sixth photosensitive element, with respect to pixels included in the second pixel group among pixels included in an image frame outputted from the image sensor, or wherein the one or more computer programs further include computer-executable instructions that, when executed by the one or more processors individually or collectively, cause the electronic device to rearrange information outputted from the fifth photosensitive element and information outputted from the sixth photosensitive element, with respect to pixels included in the second pixel group among pixels included in an image frame outputted from the image sensor.

9. The electronic device of claim 1, wherein the first pixel group and the second pixel group are included in a first unit region of the image sensor, wherein the image sensor further comprises a second unit region comprising a third pixel group and a fourth pixel group, wherein the third pixel group comprises photosensitive elements configured to read phase difference information of a direction corresponding to phase difference information read from the photosensitive elements of the first pixel group, wherein the fourth pixel group comprises photosensitive elements configured to read phase difference information of a direction corresponding to phase difference information read from the photosensitive elements of the second pixel group, and wherein a position at which the fourth pixel group is disposed within the second unit region is at least in part different from a position at which the second pixel group is disposed within the first unit region.

10. The electronic device of claim 1, wherein the one or more computer programs further include computer-executable instructions that, when executed by the one or more processors individually or collectively, cause the electronic device to acquire first phase difference data by summing a signal read based on the first operation signal and a signal read based on the second operation signal from the image sensor.

11. A method performed by an electronic device comprising an image sensor which comprises a first pixel group comprising a first photosensitive element, a second photosensitive element and a third photosensitive element, and a second pixel group comprising a fourth photosensitive element, a fifth photosensitive element and a sixth photosensitive element, the method comprising:

reading a signal from the first photosensitive element and the fourth photosensitive element based on a first operation signal;

reading a signal from the second photosensitive element and the sixth photosensitive element based on a second operation signal; and reading a signal from the third photosensitive element and the fifth photosensitive element based on a third operation signal, wherein the first photosensitive element is disposed to receive at least a part of light passing through a first micro lens, wherein the second photosensitive element is disposed in a first direction with respect to the first photosensitive element, wherein the third photosensitive element is disposed in a second direction different from the first direction with respect to the first photosensitive element, and wherein the fourth photosensitive element is disposed to receive at least a part of light passing through a second micro lens, wherein the fifth photosensitive element is disposed in the first direction with respect to the fourth photosensitive element, and wherein the sixth photosensitive element is disposed in the second direction with respect to the fourth photosensitive element.

12. The method of claim 11, wherein the first direction and the second direction are orthogonal to each other, and wherein the method further comprises:

obtaining first phase difference data for a phase difference between pixels disposed in the second direction from the first pixel group; and obtaining second phase difference data for a phase difference between pixels disposed in the first direction from the second pixel group.

13. The method of claim 11, further comprising:

determining whether a designated condition is satisfied;

transmitting the first operation signal and the third operation signal together based on determining that the designated condition is not satisfied; and transmitting the first operation signal and the second operation signal together based on determining that the designated condition is not satisfied.

14. The method of claim 13, wherein the designated condition is that reliability of a phase difference of the second direction is higher than reliability of a phase difference of the first direction.

15. The method of claim 11, further comprising:

rearranging information outputted from the fifth photosensitive element and information outputted from the sixth photosensitive element, with respect to pixels included in the second pixel group among pixels included in an image frame outputted from the image sensor.

16. One or more non-transitory computer-readable storage media storing one or more computer programs including computer-executable instructions that, when executed by one or more processors of an electronic device individually or collectively, cause the electronic device to perform operations, the electronic device comprising an image sensor which comprises a first pixel group comprising a first photosensitive element, a second photosensitive element and a third photosensitive element, and a second pixel group comprising a fourth photosensitive element, a fifth photosensitive element and a sixth photosensitive element, the operations comprising:

reading, by the electronic device, a signal from the first photosensitive element and the fourth photosensitive element based on a first operation signal;

reading, by the electronic device, a signal from the second photosensitive element and the sixth photosensitive element based on a second operation signal; and reading, by the electronic device, a signal from the third photosensitive element and the fifth photosensitive element based on a third operation signal, wherein the first photosensitive element is disposed to receive at least a part of light passing through a first micro lens, wherein the second photosensitive element is disposed in a first direction with respect to the first photosensitive element, wherein the third photosensitive element is disposed in a second direction different from the first direction with respect to the first photosensitive element, wherein the fourth photosensitive element is disposed to receive at least a part of light passing through a second micro lens, wherein the fifth photosensitive element is disposed in the first direction with respect to the fourth photosensitive element, and wherein the sixth photosensitive element is disposed in the second direction with respect to the fourth photosensitive element.

17. The one or more non-transitory computer-readable storage media of claim 16, wherein the first direction and the second direction are orthogonal to each other, and wherein the operations further comprising:

obtaining first phase difference data for a phase difference between pixels disposed in the second direction from the first pixel group; and obtaining second phase difference data for a phase difference between pixels disposed in the first direction from the second pixel group.

18. An image sensor comprising:

a first pixel group and a second pixel group, wherein the first pixel group comprises a first unit pixel comprising a first individual pixel, a second individual pixel and a third individual pixel corresponding to a first micro lens, wherein the second individual pixel is disposed in a first direction with respect to the first individual pixel, wherein the third individual pixel is disposed in a second direction different from the first direction with respect to the first individual pixel, wherein the second pixel group comprises a second unit pixel comprising a fourth individual pixel, a fifth individual pixel and a sixth individual pixel corresponding to a second micro lens, wherein the fifth individual pixel is disposed in the first direction with respect to the fourth individual pixel, wherein the sixth individual pixel is disposed in the second direction with respect to the fourth individual pixel, wherein the first individual pixel and the fourth individual pixel are connected to a first signal line transmitting a first operation signal, wherein the second individual pixel and the sixth individual pixel are connected to a second signal line transmitting a second operation signal, and wherein the third individual pixel and the fifth individual pixel are connected to a third signal line transmitting a third operation signal.

19. The image sensor of claim 18, wherein the first individual pixel comprises a first switch connected between a first photosensitive element and a first floating diffusion node of the first unit pixel, wherein the second individual pixel comprises a second switch connected between a second photosensitive element and the first floating diffusion node, wherein the third individual pixel comprises a third switch connected between a third photosensitive element and the first floating diffusion node, wherein the fourth individual pixel comprises a fourth switch connected between a fourth photosensitive element and a second floating diffusion node of the second unit pixel, wherein the fifth individual pixel comprises a fifth switch connected between a fifth photosensitive element and the second floating diffusion node, wherein the sixth individual pixel comprises a sixth switch connected between a sixth photosensitive element and the second floating diffusion node, wherein the first signal line is connected to the first switch and the fourth switch, wherein the second signal line is connected to the second switch and the sixth switch, and wherein the third signal line is connected to the third switch and the fifth switch.

20. The image sensor of claim 19, wherein the first unit pixel comprises a plurality of photosensitive elements arranged in an N×N array, comprising the first photosensitive element, the second photosensitive element and the third photosensitive element, wherein the second unit pixel comprises a plurality of photosensitive elements comprising the fourth photosensitive element, the fifth photosensitive element and the sixth photosensitive element and arranged in an N×N array, and wherein N is greater than or equal to 2.

21. The image sensor of claim 18, wherein the first direction and the second direction are directions orthogonal to each other, and wherein the image sensor further comprises:

a computation processor configured to:

obtain first phase difference data for a phase difference between pixels disposed in the second direction from the first pixel group, and obtain second phase difference data for a phase difference between pixels disposed in the first direction from the second pixel group.

22. The image sensor of claim 18, wherein a number of unit pixels of the first pixel group is greater than a number of unit pixels of the second pixel group in a unit region of the image sensor.

23. The image sensor of claim 18, further comprising:

a micro lens array (MLA);

a color filter array (CFA); and a light receiver.

24. The image sensor of claim 23, wherein the MLA is disposed to collect a light bundle passing through a lens assembly and forming an image on the image sensor at a light receiving element of the light receiver.

25. The image sensor of claim 24, wherein the light bundle passing through the MLA is blocked in at least a part of another wavelength than a bandwidth corresponding to a specific color while passing through the CFA.

* * * * *